United States Patent
Yuan et al.

(10) Patent No.: US 12,482,143 B2
(45) Date of Patent: Nov. 25, 2025

(54) POINT CLOUD ENCODING METHOD AND SYSTEM, POINT CLOUD DECODING METHOD AND SYSTEM, POINT CLOUD ENCODER, AND POINT CLOUD DECODER

(71) Applicant: GUANGDONG OPPO MOBILE TELECOMMUNICATIONS CORP., LTD., Guangdong (CN)

(72) Inventors: Hui Yuan, Guangdong (CN); Xiaohui Wang, Guangdong (CN); Lu Wang, Guangdong (CN); Qi Liu, Guangdong (CN); Ming Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 365 days.

(21) Appl. No.: 18/318,656

(22) Filed: May 16, 2023

(65) Prior Publication Data

US 2023/0290012 A1 Sep. 14, 2023

Related U.S. Application Data

(63) Continuation of application No. PCT/CN2020/140248, filed on Dec. 28, 2020.

(51) Int. Cl.
 *G06T 9/00* (2006.01)
 *G06T 7/60* (2017.01)
 (Continued)

(52) U.S. Cl.
 CPC .............. *G06T 9/001* (2013.01); *G06T 7/60* (2013.01); *G06T 17/00* (2013.01); *G06V 10/25* (2022.01); *H04N 19/103* (2014.11)

(58) Field of Classification Search
None
See application file for complete search history.

(56) References Cited

U.S. PATENT DOCUMENTS

2020/0105025 A1\* 4/2020 Yea .................... G06T 15/08
2020/0151915 A1\* 5/2020 Li ........................ G06T 7/60
(Continued)

FOREIGN PATENT DOCUMENTS

CN 110996098 A 4/2020
CN 111145090 A 5/2020
(Continued)

OTHER PUBLICATIONS

First Office Action of the Japanese application No. 2023-536205, issued on Nov. 26, 2024. 8 pages with English translation.
(Continued)

*Primary Examiner* — Stefan Gadomski
(74) *Attorney, Agent, or Firm* — PERKINS COIE LLP

(57) ABSTRACT

The present disclosure provides a point cloud encoding method and system, a point cloud decoding method and system, a point cloud encoder, and a point cloud decoder. A prediction mode of attribute information of a current point is determined through geometric information of a point in a point cloud, so that a determination process of the prediction mode is decoupled from a reconstruction process of the attribute information of the point in the point cloud, the two processes can be performed in parallel, and thus the efficiency of encoding and decoding is improved.

18 Claims, 13 Drawing Sheets

FIG. 7

(51) Int. Cl.
  *G06T 17/00* (2006.01)
  *G06V 10/25* (2022.01)
  *H04N 19/103* (2014.01)

(56) References Cited

U.S. PATENT DOCUMENTS

| | | | |
|---|---|---|---|
| 2020/0217937 A1* | 7/2020 | Mammou | G01S 7/4861 |
| 2020/0311984 A1 | 10/2020 | Yea et al. | |
| 2021/0092355 A1* | 3/2021 | Sugio | G06T 9/00 |
| 2021/0099696 A1* | 4/2021 | Sugio | G06T 9/00 |
| 2021/0104013 A1* | 4/2021 | Hur | G06T 9/001 |
| 2021/0104075 A1* | 4/2021 | Mammou | G06T 9/40 |
| 2021/0104090 A1* | 4/2021 | Hur | G06T 15/005 |
| 2021/0105458 A1* | 4/2021 | Sugio | G06T 9/00 |
| 2021/0105493 A1* | 4/2021 | Mammou | H04N 19/20 |
| 2021/0105504 A1* | 4/2021 | Hur | H04N 19/167 |
| 2021/0211722 A1* | 7/2021 | Hur | H04N 19/70 |
| 2021/0320960 A1* | 10/2021 | Hur | H04L 65/762 |
| 2022/0005230 A1* | 1/2022 | Li | G06T 7/75 |
| 2022/0254057 A1* | 8/2022 | Li | G06V 20/64 |
| 2022/0383552 A1* | 12/2022 | Hur | G06T 9/004 |
| 2023/0196625 A1* | 6/2023 | Li | G06T 9/004 |
| | | | 382/232 |

FOREIGN PATENT DOCUMENTS

| | | |
|---|---|---|
| WO | 2019240215 A1 | 12/2019 |
| WO | 2020197086 A1 | 10/2020 |
| WO | 2020198180 A1 | 10/2020 |

OTHER PUBLICATIONS

International Search Report with English translation in the international application No. PCT/CN2020/140248, mailed on Sep. 16, 2021. (5 pages).

Written Opinion with English translation of the International Search Authority in the international application No. PCT/CN2020/140248, mailed on Sep. 16, 2021. (6 pages).

* cited by examiner

POINT CLOUD ENCODING METHOD AND SYSTEM, POINT CLOUD DECODING METHOD AND SYSTEM, POINT CLOUD ENCODER, AND POINT CLOUD DECODER

CROSS REFERENCE TO RELATED APPLICATION

This is a continuation of International Patent Application No. PCT/CN2020/140248 filed on Dec. 28, 2020, the disclosure of which is incorporated herein by reference in its entirety.

TECHNICAL FIELD

The application relates to the technical field of point cloud encoding and decoding, and in particular, to a point cloud encoding method and system, a point cloud decoding method and system, a point cloud encoder, and a point cloud decoder.

BACKGROUND

A surface of an object is collected through a collection device, so as to form point cloud data. The point cloud data includes hundreds of thousands or even more points. In a video production process, the point cloud data is transmitted between a point cloud encoding device and a point cloud decoding device in the form of point cloud media. However, such a large number of points bring challenges to transmission. Therefore, the point cloud encoding device needs to transmit the point cloud data after compression.

The compression of the point cloud data mainly includes the compression of geometric information and the compression of attribute information. During the compression of the attribute information, redundant information in the point cloud data is reduced or eliminated through prediction. For example, one or more adjacent points of the current point is acquired from an encoded point, and attribute information of the current point is predicted according to the attribute information of the adjacent points.

At present, a prediction mode of the current point is determined based on reconstructed values of the attribute information of the adjacent point, and a determination process of the prediction mode is decoupled from a reconstruction process of the attribute information, and thus a point cloud encoding effect is reduced.

DETAILED DESCRIPTION

Figure 1:
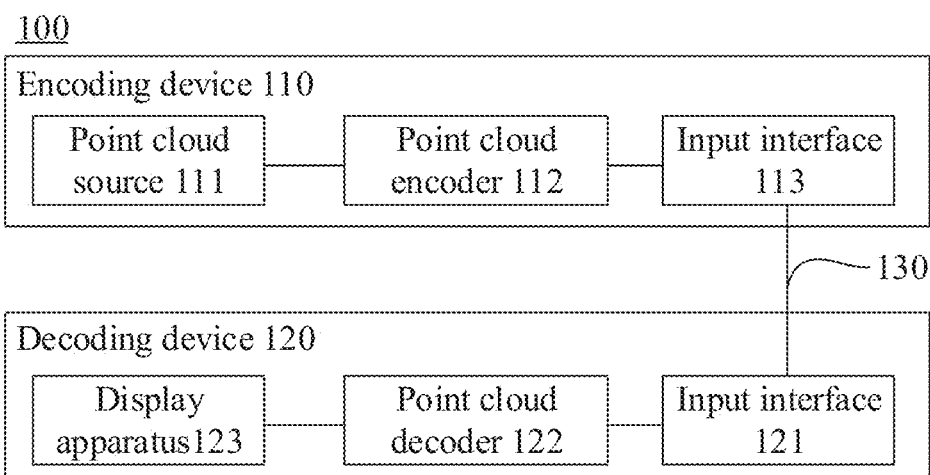
FIG. 1 is a schematic block diagram of a point cloud encoding and decoding system 100 involved in an embodiment of the present disclosure.

The present disclosure may be applied to the technical field of point cloud compression.

For ease of understanding of the embodiments of the present disclosure, related concepts involved in the embodiments of the present disclosure will be briefly introduced as follows first.

A point cloud refers to a group of randomly distributed discrete points in space that represent a spatial structure and surface attributes of a 3-Dimension (3D) object or a 3D scenario.

Point cloud data is a specific record form of the point cloud. Points in the point cloud may include position information of the points and attribute information of the points. For example, the position information of the points may be 3D coordinate information of the points. The position information of the points may also be referred to as geometric information of the points. For example, the attribute information of the points may include colour information and/or reflectivity. For example, the colour information may be information in any colour space. For example, the colour information may be Red, Green, and Blue (RGB). For another example, the colour information may be YcbCr (YUV) information. For example, Y represents luma, Cb (U) represents blue chromatic aberration, Cr (V) represents red, and U and V represent chroma, which is used for describing chromatic aberration information. For example, points in the point cloud obtained according to a principle of laser measurement may include 3D coordinate information of the points and laser reflectance of the points. For yet another example, points in the point cloud obtained according to a principle of photogrammetry may include 3D coordinate information of the points and colour information of the points. For example, points in the point cloud obtained by combining the principles of laser measurement and photogrammetry may include the 3D coordinate information of the points, the laser reflectance of the points, and the colour information of the points.

Approaches of acquiring the point cloud data may include, but are not limited to, at least one of the following. (1) The point cloud data may be generated by a computer device. The computer device may generate the point cloud data according to a virtual 3D object and a virtual 3D scenario. (2) The point cloud data is acquired by 3D laser scanning. The point cloud data of a 3D object or a 3D scenario in a static real world may be acquired through 3D laser scanning. Millions of bits of point cloud data may be acquired every second. (3) The point cloud data is acquired by 3D photogrammetry. A visual scenario in the real world is collected by a 3D photographic device (that is, a group of video cameras or a photographic device with a plurality of camera lenses and sensors), so as to obtain the point cloud data of the visual scenario of the real world. The point cloud data of the 3D object or the 3D scenario in a dynamic real world is obtained through 3D photography. (4) The point cloud data of biological tissues and organs is obtained through medical devices. In the field of medicine, the point cloud data of biological tissues and organs is obtained through the medical devices, such as Magnetic Resonance Imaging (MRI), Computed Tomography (CT), and electromagnetic positioning information.

Point clouds may be divided into dense point clouds and sparse point clouds according to ways of acquisition.

The point clouds may be divided into type 1 static point cloud, type 2 dynamic point cloud, and type 3 dynamically acquired point cloud according to the timing type of data.

In a type 1 static point cloud, an object is static, and a device for acquiring the point cloud is also static.

In a type 2 dynamic point cloud, an object is dynamic, but the device for acquiring the point cloud is static.

In a type 3 dynamically acquired point cloud, the device for acquiring the point cloud is dynamic.

The point clouds are divided into two types according to purposes.

Type 1 refers to a machine perception point cloud, which can be used for scenarios, such as an autonomous navigation system, a real-time inspection system, a geographic information system, a visual sorting robot, and a rescue robot.

Type 2 refers to a human eye perception point cloud, which can be used for point cloud application scenarios, such as digital cultural heritage, free view broadcasting, 3D immersive communication, and 3D immersive interaction.

FIG. 1 is a schematic block diagram of a point cloud encoding and decoding system 100 involved in an embodiment of the present disclosure. It is to be noted that FIG. 1 is only an example. The point cloud encoding and decoding system of the embodiment of the present disclosure includes, but is not limited to, that shown in FIG. 1. As shown in FIG. 1, the point cloud encoding and decoding system 100 includes an encoding device 110 and a decoding device 120. The encoding device is configured to perform encoding (which can be understood as compressing) on point cloud data to generate a bitstream, and transmit the bitstream to the decoding device. The decoding device decodes the bitstream generated by encoding by the encoding device, so as to obtain decoded point cloud data.

The encoding device 110 of the embodiment of the present disclosure may be understood as a device with a point cloud encoding function. The decoding device 120 may be understood as a device with a point cloud decoding function. That is, the encoding device 110 and the decoding device 120 of the embodiment of the present disclosure includes wider apparatuses, such as smart phones, desktop computers, mobile computing apparatuses, notebook (for example, laptop) computers, tablet computers, set-top boxes, televisions, cameras, display apparatuses, digital media players, video game consoles, vehicle computers, or the like.

In some embodiments, the encoding device 110 may transmit the encoded point cloud data (such as the bitstream) to the decoding device 120 through a channel 130. The channel 130 may include one or more media and/or apparatus that can transmit the encoded point cloud data from the encoding device 110 to the decoding device 120.

In one example, the channel 130 includes one or more communication media that can enable the encoding device 110 to directly transmit the encoded point cloud data to the decoding device 120 in real time. In this example, the encoding device 110 may modulate the encoded point cloud data according to a communication standard, and transmit the modulated point cloud data to the decoding device 120. The communication media include wireless communication media, such as radio-frequency spectra. Optionally, the communication media may also include wired communication media, for example, one or more physical transmission lines.

In another example, the channel 130 includes a storage medium. The storage medium may store the point cloud data after being encoded by the encoding device 110. The storage medium includes a plurality of locally accessible data storage media, such as a compact disk, DVD, flash memory, and the like. In this example, the decoding device 120 may acquire the encoded point cloud data from the storage medium.

In another example, the channel 130 may include a storage server. The storage server may store the point cloud data after being encoded by the encoding device 110. In this example, the decoding device 120 may download the stored and encoded point cloud data from the storage server. Optionally, the storage server may store the encoded point cloud data and transmit the encoded point cloud data to the decoding device 120, such as a web server (for example, a website), and a File Transfer Protocol (FTP) server.

In some embodiments, the encoding device 110 includes a point cloud encoder 112 and an output interface 113. The output interface 113 may include a modulator/demodulator (modem) and/or a transmitter.

In some embodiments, the encoding device 110 may further include a point cloud source 111 in addition to the point cloud encoder 112 and the input interface 113.

The point cloud source 111 may include at least one of a point cloud collection apparatus (for example, a scanner), a point cloud archive, a point cloud input interface, and a computer graphics system. The point cloud input interface is configured to receive the point cloud data from a point cloud content provider. The computer graphics system is configured to generate point cloud data.

The point cloud encoder 112 encodes the point cloud data from the point cloud source 111, so as to generate a bitstream. The point cloud encoder 112 directly transmits the encoded point cloud data to the decoding device 120 through the output interface 113. The encoded point cloud data may also be stored in a storage medium or a storage server for the decoding device 120 to read subsequently.

In some embodiments, the decoding device 120 includes an input interface 121 and a point cloud decoder 122.

In some embodiments, the decoding device 120 may further include a display apparatus 123 in addition to the input interface 121 and the point cloud decoder 122.

The input interface 121 includes a receiver and/or a modem. The input interface 121 may receive the encoded point cloud data through the channel 130.

The point cloud decoder 122 is configured to decode the encoded point cloud data to obtain a decoded point cloud data, and transmits the decoded point cloud data to the display apparatus 123.

The display apparatus 123 displays the decoded point cloud data. The display apparatus 123 may be integrated with the decoding device 120, or may be located outside the decoding device 120. The display apparatus 123 may include a plurality of display apparatuses, for example, liquid crystal displays (LCDs), plasma displays, Organic Light-Emitting Diode (OLED) displays, or other types of display apparatuses.

In addition, FIG. 1 is only an example, and the technical solution of the embodiment of the present disclosure is not limited to FIG. 1. For example, the technology of the present disclosure may also be applied to single-side point cloud encoding or single-side point cloud decoding.

At present, the point cloud encoder may adopt a Geometry Point Cloud Compression (G-PCC) encoding and decoding framework or a Video Point Cloud Compression (V-PCC) encoding and decoding framework provided by the Moving Picture Experts Group (MPEG), or may adopt an Audio Video Standard-PCC (AVS-PCC) encoding and decoding framework provided by the AVS. Both the G-PCC and the AVS-PCC are for static sparse point clouds, and their encoding frameworks are roughly the same. The G-PCC encoding and decoding framework may be configured to perform compression for a first static point cloud and a type-3 dynamically acquired point cloud. The V-PCC encoding and decoding framework may be configured to perform compression for a type-2 dynamic point cloud. The G-PCC encoding and decoding framework is also referred to as a point cloud encoder/decoder TMC13. The V-PCC encoding and decoding framework is also referred to as a point cloud encoder/decoder TMC2.

The point cloud encoder and the point cloud decoder applicable to the embodiment of the present disclosure will be described below by taking the G-PCC encoding and decoding framework as an example.

Figure 2:
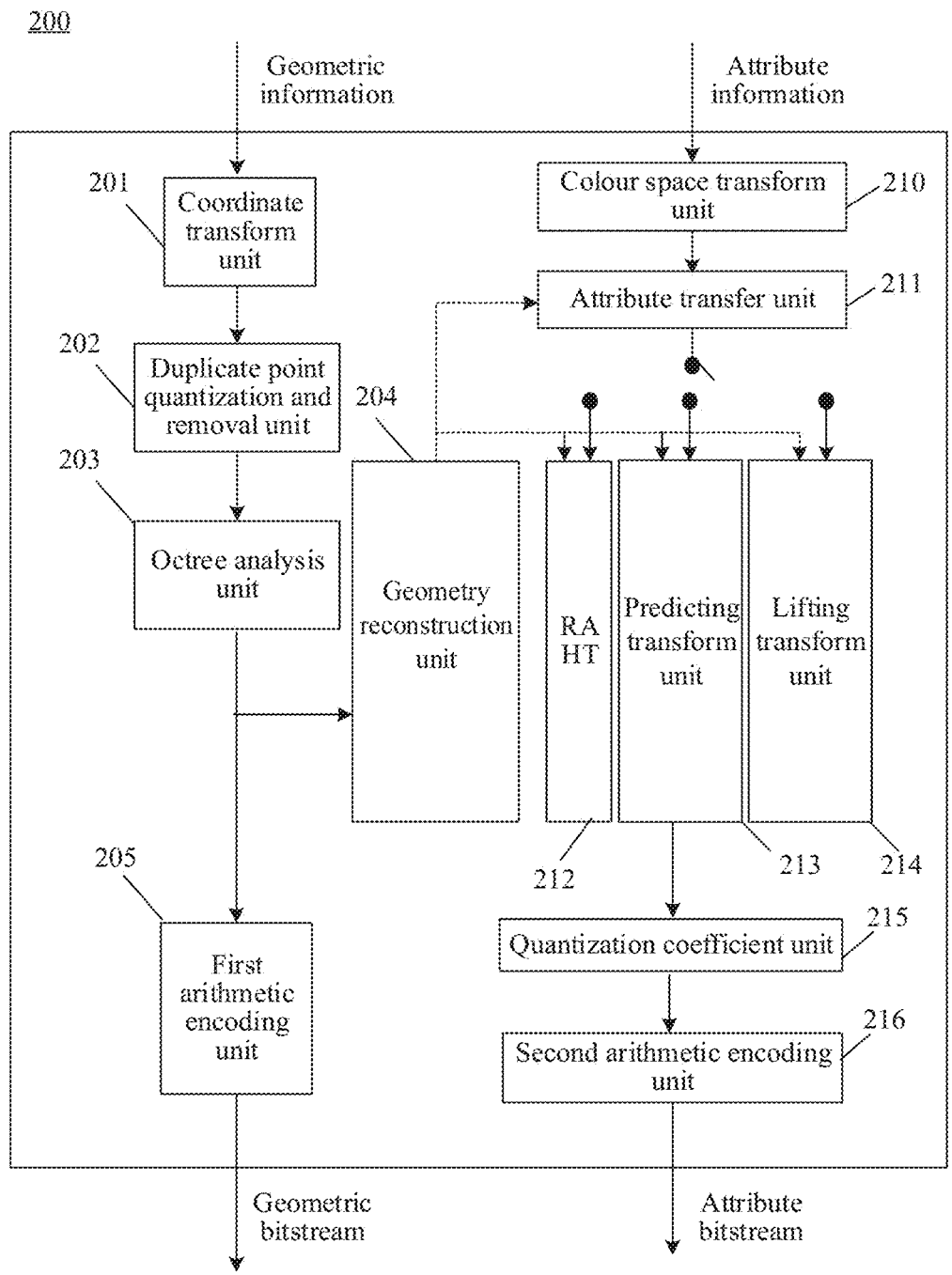
FIG. 2 is a schematic block diagram of a point cloud encoder 200 according to an embodiment of the present disclosure.

FIG. 2 is a schematic block diagram of a point cloud encoder 200 according to an embodiment of the present disclosure.

It can be known from the above that the points in the point cloud may include position information of the points and attribute information of the points. The encoding of the points in the point cloud may include position encoding and attribute encoding. In some examples, the position information of the points in the point cloud may also be referred to as geometric information, and accordingly, the position encoding of points in the point cloud may also be referred to as geometric encoding.

A process of position encoding includes that: preprocessing, such as coordinate transform, quantization, and removal of duplicate points, is performed on the points in the point cloud; then, geometric encoding, such as octree construction, is performed on the preprocessed point cloud, and geometric encoding is performed based on the constructed octree to form a geometric bitstream. Meanwhile, the position information of each point in the point cloud data is reconstructed based on the position information output by the constructed octree, so as to obtain a reconstructed value of the position information of each point.

A process of attribute encoding includes that: one of three prediction modes is selected to perform point cloud prediction by giving original values of the reconstruction information and attribute information of the position information of an input point cloud, predicted results are quantized, and arithmetic encoding is performed to form an attribute bitstream.

As shown in FIG. 2, the position encoding may be implemented by the following units:

a coordinate transform unit 201, a duplicate point quantization and removal unit 202, an octree analysis unit 203, a geometry reconstruction unit 204, and a first arithmetic encoding unit 205.

The coordinate transform unit 201 may be configured to transform world coordinates of the points in the point cloud into relative coordinates. For example, the minimum values of xyz coordinate axes are subtracted from the geometric coordinates of the points respectively, which is equivalent to a DC removal operation, so as to transform the coordinates of the points in the point cloud from world coordinates to relative coordinates.

The duplicate point quantization and removal unit 202 may reduce the number of coordinates by quantization. After the quantization, the original different points may be endowed with the same coordinates. On this basis, duplicate points may be deleted through a de-duplication operation. For example, a plurality of clouds with the same quantization position and different attribute information may be merged into one cloud through attribute transform. In some embodiments of the present disclosure, the duplicate point quantization and removal unit 202 may be an optional unit module.

The octree analysis unit 203 may encode the position information of the quantized points in an octree encoding mode. For example, the point cloud is divided in the form of an octree. Therefore, the positions of the points may be in one-to-one correspondence with positions of points in the octree. The positions of the points in the octree are counted, and are flagged as 1, so as to perform geometric encoding.

The geometry reconstruction unit 204 may perform position reconstruction based on the position information output by the octree analysis unit 203, so as to obtain a reconstructed value of the position information of each point in the point cloud data.

The first arithmetic encoding unit 205 may perform arithmetic encoding on the position information output by the octree analysis unit 203 in an entropy encoding mode, that is, a geometric bitstream is generated through the position information output by the octree analysis unit 203 in an arithmetic encoding mode. The geometric bitstream is also referred to as a geometry bitstream.

The attribute encoding may be implemented by the following units:

a colour space transform unit 210, an attribute transfer unit 211, a Region Adaptive Hierarchical Transform (RAHT) unit 212, a predicting transform unit 213, a lifting transform unit 214, a quantization coefficient unit 215, and a second arithmetic encoding unit 216.

It is to be noted that the point cloud encoder 200 may include more, fewer, or different functional components from those in FIG. 2.

The colour space transform 210 may be configured to transform the RGB colour space of the points in the point cloud into a YCbCr format or other formats.

The attribute transfer unit 211 may be configured to transfer the attribute information of the points in the point cloud, so as to minimize attribute distortion. For example, the attribute transfer unit 211 may be configured to obtain original values of the attribute information of the points. For example, the attribute information may be colour information of the points.

After the original value of the attribute information of a point is transferred by the attribute transfer unit 211, any prediction unit may be selected to predict the point in the point cloud. The prediction unit may include: a RAHT 212, a predicting transform unit 213, and a lifting transform unit 214.

In other words, any one of the RAHT 212, the predicting transform unit 213, and the lifting transform unit 214 may be configured to predict the attribute information of a point in the point cloud, so as to obtain a predicted value of the attribute information of the point, thereby obtaining a residual value of the attribute information of the point based on the predicted value of the attribute information of the point. For example, the residual value of the attribute information of the point may be obtained by subtracting the predicted value of the attribute information of the point from the original value of the attribute information of the point.

In an embodiment of the present disclosure, the predicting transform unit 213 may further be configured to generate a level of detail (LOD). A process of generating the LOD includes that: Euclidean distances between points is acquired according to the position information of the points in the point cloud; and the points are divided into different detail expression layers according to the Euclidean distances. In one embodiment, Euclidean distances in different ranges may be divided into different detail expression layers after the Euclidean distances are sorted. For example, one point may be randomly selected to serve as a first detail expression layer. Then, the Euclidean distances between the remaining points and the point are calculated, and the points with the Euclidean distances meeting a first threshold value requirement are grouped into a second detail expression layer. A centroid of the points in the second detail expression layer is acquired. The Euclidean distances between the points outside the first detail expression layer and the second detail expression layer and the centroid are calculated, and the points with the Euclidean distances meeting a second threshold value requirement are grouped into a third detail expression layer. By analogy, all points are grouped into detail expression layers. The number of the points of each LOD layer may be gradually increased by adjusting the threshold value of the Euclidean distances. It is to be understood that the LOD may also be divided in other modes. No limits are made thereto in the present disclosure.

It is to be noted that, the point cloud may be directly divided into one or more detail expression layers, or the point cloud may be divided into a plurality of point cloud slices, and then, each point cloud slice is divided into one or more LOD layers.

For example, the point cloud is divided into a plurality of point cloud slices. The number of the points of each point cloud slice may range from 550,000 to 1100,000. Each point cloud slice may be regarded as a separate point cloud. Each point cloud slice may also be divided into a plurality of detail expression layers. Each detail expression layer includes a plurality of points. In one embodiment, division into the detail expression layers may be performed based on the Euclidean distances between the points.

The quantization unit 215 may be configured to quantize the residual values of the attribute information of the points.

For example, if the quantization unit 215 is connected to the predicting transform unit 213, the quantization unit may be configured to quantize the residual values of the attribute information of the points output by the predicting transform unit 213.

For example, the residual values of the attribute information of the points output by the predicting transform unit 213 are quantized by using a quantization step, so as to improve the system performance.

The second arithmetic encoding unit 216 may perform entropy encoding on the residual values of the attribute information of the points by using zero run length coding, so as to obtain an attribute bitstream. The attribute code may be bitstream information.

Figure 3:
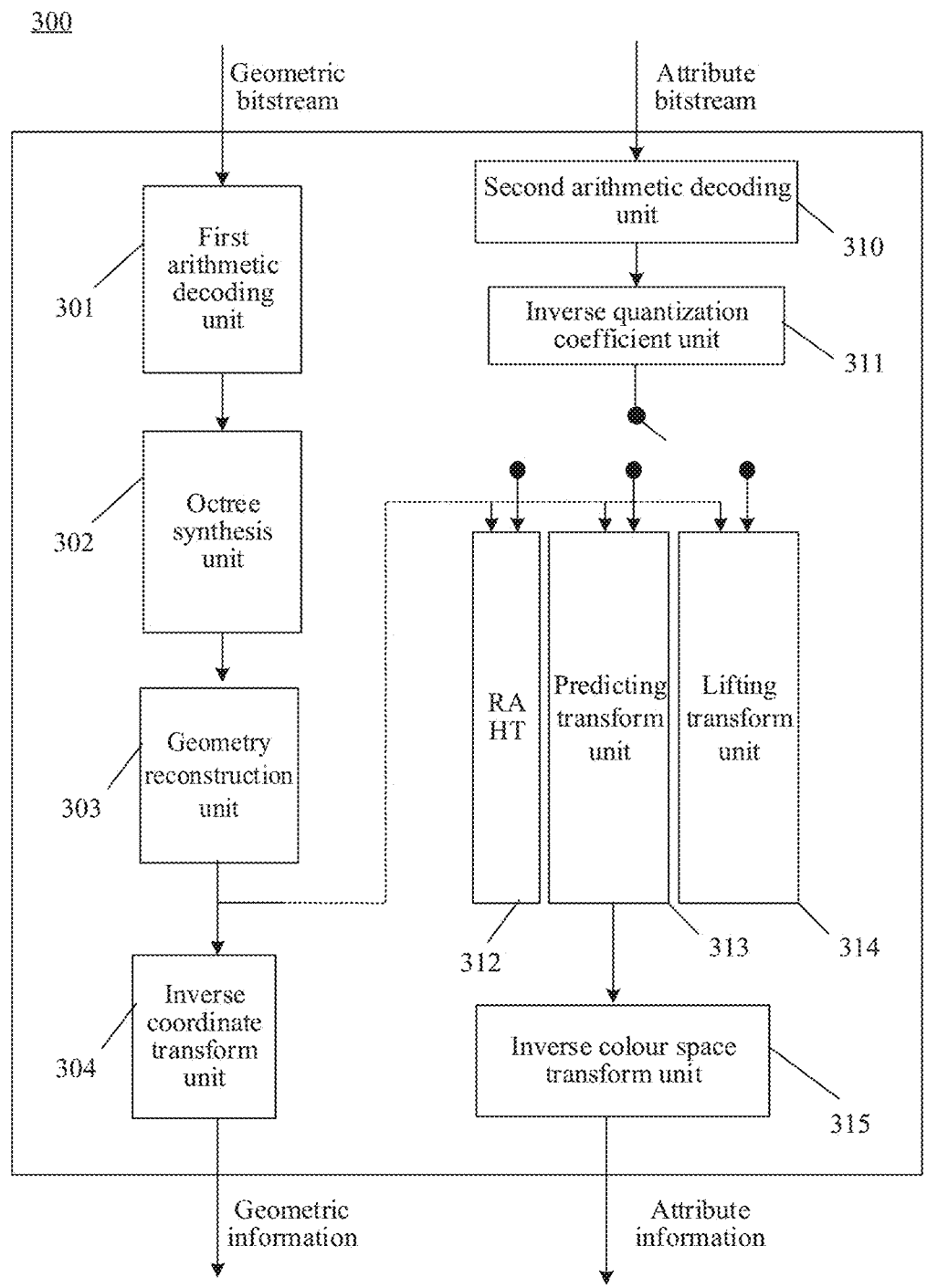
FIG. 3 is a schematic block diagram of a decoder 300 according to an embodiment of the present disclosure.

FIG. 3 is a schematic block diagram of a decoder 300 according to an embodiment of the present disclosure.

As shown in FIG. 3, the decoding framework 300 may acquire a point cloud bitstream from the encoding device and parse the bitstream, to obtain the position information and the attribute information of the point in the point cloud. The decoding of the point cloud includes position decoding and attribute decoding.

A process of position decoding includes that: arithmetic decoding is performed on the geometric bitstream; merging is performed after constructing the octree, and the position information of the points is reconstructed to obtain reconstruction information of the position information of the points; and coordinate transform is performed on the reconstruction information of the position information of the points, so as to obtain the position information of the points. The position information of the points may also be referred to as geometric information of the points.

A process of attribute decoding includes that: residual value of the attribute information of the point in the point cloud is acquired; inverse quantization is performed on the residual value of the attribute information of the point, so as to obtain the residual value of the attribute information of the point after the inverse quantization; based on the reconstruction information of the position information of the point acquired in the process of position decoding, one of the following three predicting modes, such as the RAHT, the predicting transform, and the lifting transform, is selected to perform point cloud predicting to obtain a predicted value; the predicted value is added to the residual value to obtain a reconstructed value of the attribute information of the point; and inverse colour space transform is performed on the reconstructed value of the attribute information of the point, so as to obtain a decoded point cloud.

As shown in FIG. 3, the position decoding may be implemented by the following units:
a first arithmetic decoding unit 301, an octree synthesis unit 302, a geometry reconstruction unit 304, and an inverse coordinate transform unit 305.

The attribute encoding may be implemented by the following units:
a second arithmetic decoding unit 310, an inverse quantization unit 311, a RAHT unit 312, a predicting transform unit 313, a lifting transform unit 314, and an inverse colour space transform (inverse transform colours) unit 315.

It is to be noted that the decompression is an inverse process of compression. Similarly, the functions of various units in the decoder 300 may refer to the functions of the corresponding units in the encoder 200. In addition, the point cloud decoder 300 may include more, less, or different functional components compared with those in FIG. 3.

For example, the decoder 300 may divide the point cloud into a plurality of LODs according to the Euclidean distances between the points in the point cloud; then, decode the attribute information of the points in the LODs in sequence, for example, the number (zero_cnt) of zeros in the zero run length coding technology is determined, so as to decode a residual based on the zero_cnt; and next, a decoding framework 200 may perform inverse quantization based on the decoded residual value, and add the residual value after the inverse quantization and the predicted value of the current point to obtain a reconstructed value of the point cloud until the whole point cloud is decoded. The current point will be used as the nearest neighbour point of the points in a subsequent LOD, and the attribute information of the subsequent point is predicted by using the reconstructed value of the current point.

It can be known from FIG. 2 above that the point cloud encoder 200 mainly includes two parts in terms of function: a position encoding module and an attribute encoding module. The position encoding module is configured to realize the encoding of the position information of the point cloud to form a geometric bitstream. The attribute encoding module is configured to realize the encoding of the attribute information of the point cloud to form an attribute bitstream. The present disclosure mainly relates to the encoding of the attribute information. The attribute encoding module in the point cloud encoder involved in the present disclosure is introduced below in combination with FIG. 4.

Figure 4:
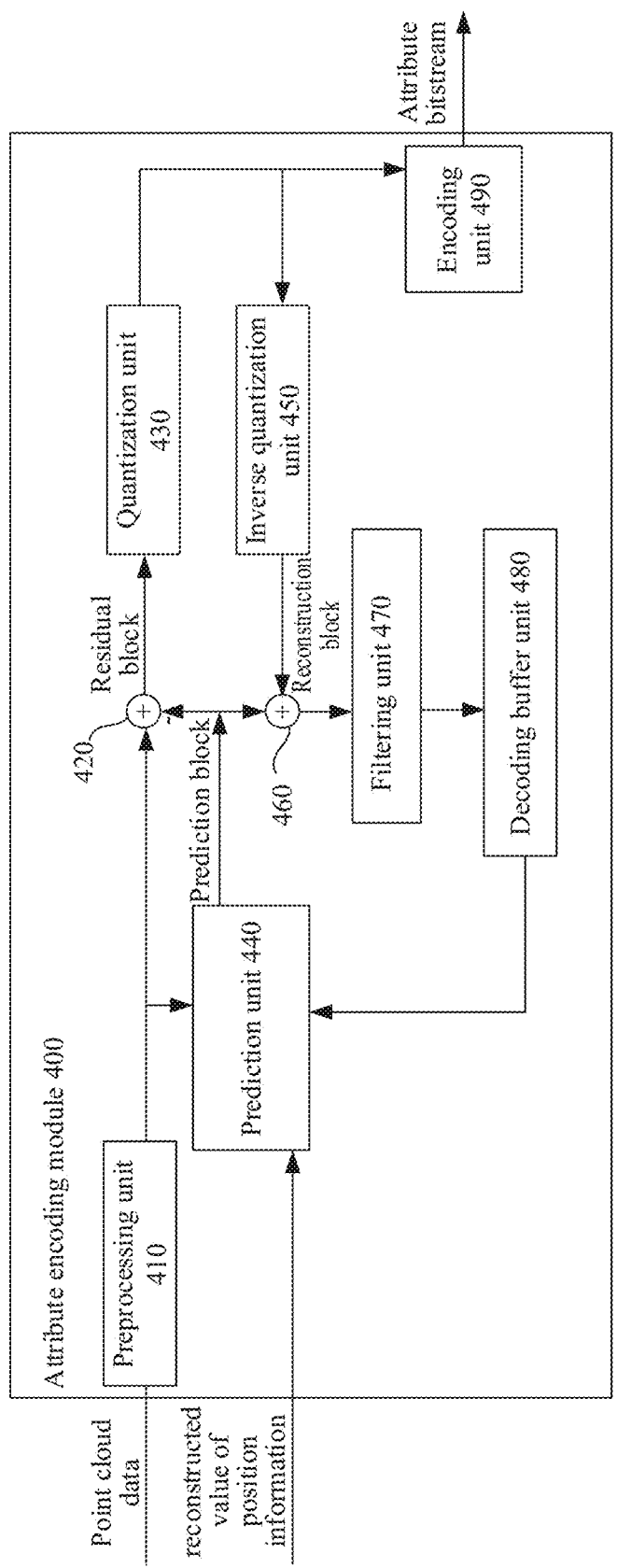
FIG. 4 is a partial block diagram of an attribute encoding module 400 involved in embodiments of the present disclosure.

FIG. 4 is a partial block diagram of an attribute encoding module 400 involved in an embodiment of the present disclosure. The attribute encoding module 400 may be understood as a unit for realizing the encoding of the attribute information in the point cloud encoder 200 as shown in FIG. 2 above. As shown in FIG. 4, the attribute encoding module 400 includes: a preprocessing unit 410, a residual unit 420, a quantization unit 430, a prediction unit 440, an inverse quantization unit 450, a reconstruction unit 460, a filtering unit 470, a decoding buffer unit 480, and an encoding unit 490. It is to be noted that the attribute encoding module 400 may further include more, fewer, or different functional components.

In some embodiments, the preprocessing unit 410 may include a colour space transform unit 210 and an attribute transfer unit 211 as shown in FIG. 2.

In some embodiments, the quantization unit 430 may be understood as the quantization coefficient unit 215 in FIG. 2 above. The encoding unit 490 may be understood as the second arithmetic encoding unit 216 in FIG. 2 above.

In some embodiments, the prediction unit 440 may include the RAHT 212, the predicting transform unit 213, and the lifting transform unit 214 as shown in FIG. 2 above. The prediction unit 440 is specifically configured to acquire the reconstruction information of the position information of the point in the point cloud, and select one of the RAHT 212, the predicting transform unit 213, and the lifting transform unit 214 to predict the attribute information of the point in the point cloud based on the reconstruction information of the position information of the point, so as to obtain a predicted value of the attribute information of the point.

The residual unit 420 may obtain a residual value of the attribute information of the point in the point cloud based on an original value and a reconstructed value of the attribute information of the point in the point cloud. For example, the residual value of the attribute information of the point is obtained by subtracting the reconstructed value of the attribute information from the original value of the attribute of the point.

The quantization unit 430 may quantize the residual value of the attribute information. Specifically, the quantization unit 430 may quantize the residual value of the attribute information of the point based on a Quantization Parameter (QP) value associated with the point cloud. The point cloud encoder may adjust the quantization degree applied to the point by adjusting the QP value associated with the point cloud.

The inverse quantization unit 450 may apply inverse quantization to the quantized residual value of the attribute information, so as to reconstruct the residual value of the attribute information from the quantized residual value of the attribute information.

The reconstruction unit 460 may add the reconstructed residual value of the attribute information to the predicted value generated by the prediction unit 440, so as to generate a reconstructed value of the attribute information of the point in the point cloud.

The filtering unit 470 may eliminate or reduce the noise in a reconstruction operation.

The decoding buffer unit 480 may store the reconstructed value of the attribute information of the point in the point cloud. The prediction unit 440 may predict the attribute information of other points by using the reconstructed values of the attribute information of the points.

It can be known from FIG. 3 above that the point cloud decoder 300 mainly includes two parts in terms of function: a position decoding module and an attribute decoding module. The position decoding module is configured to realize the decoding of the geometric bitstream of the point cloud to obtain the position information of the points. The attribute decoding module is configured to realize the decoding of the attribute bitstream of the point cloud to obtain the attribute information of the points. The attribute decoding module in the point cloud decoder involved in the present disclosure is introduced below in combination with FIG. 5.

Figure 5:
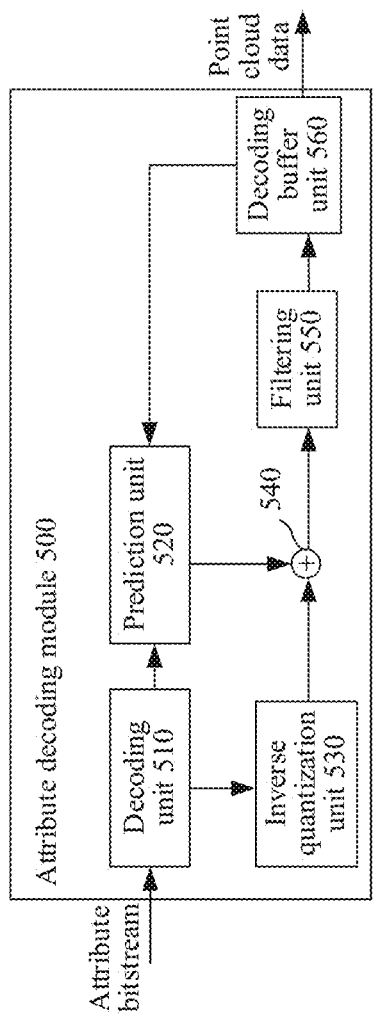
FIG. 5 is a partial block diagram of an attribute decoding module 500 involved in embodiments of the present disclosure.

FIG. 5 is a partial block diagram of an attribute decoding module 500 involved in an embodiment of the present disclosure. The attribute decoding module 500 may be understood as a unit for realizing the decoding of the attribute bitstream in the point cloud decoder 300 as shown in FIG. 3 above. As shown in FIG. 5, the attribute decoding module 500 includes: a decoding unit 510, a prediction unit 520, an inverse quantization unit 530, a reconstruction unit 540, a filtering unit 550, and a decoding buffer unit 560. It is to be noted that the attribute decoding module 500 may include more, fewer, or different functional components.

The attribute decoding module 500 may receive an attribute bitstream. The decoding unit 510 may parse the attribute bitstream to extract a syntax element from the attribute bitstream. As part of parsing the attribute bitstream, the decoding unit 510 may parse the encoded syntax element in the attribute bitstream. The prediction unit 520, the inverse quantization unit 530, the reconstruction unit 540, and the filtering unit 550 may decode the attribute information according to the syntax element extracted from the attribute bitstream.

In some embodiments, the prediction unit 520 may determine a predicting mode of the point according to one or more syntax elements parsed from the attribute bitstream, and predict the attribute information of the point by using the determined predicting mode.

The inverse quantization unit 530 may perform inverse quantization (that is, dequantization) on the quantized residual value of the attribute information associated with the point in the point cloud, so as to obtain the residual value of the attribute information of the point. The inverse quantization unit 530 may determine the quantization degree by using the QP value associated with the point cloud.

The reconstruction unit 540 may reconstruct the attribute information of the point in the point cloud by using the residual value of the attribute information of the point in the point cloud and the predicted value of the attribute information of the point in the point cloud. For example, the reconstruction unit 540 may add the residual value of the attribute information of the point in the point cloud to the predicted value of the attribute information of the point to obtain the reconstructed value of the attribute information of the point.

The filtering unit 550 may eliminate or reduce the noise in a reconstruction operation.

The attribute decoding module 500 may store the reconstructed value of the attribute information of the point in the point cloud in the decoding buffer unit 560. The attribute decoding module 500 may take the reconstructed value of the attribute information in the decoding buffer unit 560 as a reference point for subsequent prediction, or the transmit the reconstructed value of the attribute information to a display apparatus for display.

A basic process of encoding and decoding the attribute information of a point cloud is as follows: at an encoding end, the attribute information of point cloud data is preprocessed to obtain the original value of the attribute information of a point in the point cloud. The prediction unit 410 selects one of the above three predicting modes to predict the attribute information of the point in the point cloud based on the reconstructed value of the position information of the point in the point cloud, so as to obtain a predicted value of the attribute information. The residual unit 420 may calculate the residual value of the attribute information based on the original value and the predicted value of the attribute information of the point in the point cloud, that is, the difference between the original value of the attribute information of the point in the point cloud and the predicted value of the attribute information of the point in the point cloud is taken as the residual value of the attribute information of the point in the point cloud. The residual value is quantized by the quantization unit 430, which can remove information insensitive to human eyes to eliminate visual redundancy. The encoding unit 490 receives the quantized residual value of the attribute information output by the quantization unit 430, and may encode the quantized residual value of the attribute information and output an attribute bitstream.

In addition, the inverse quantization unit 450 may also receive the quantized residual value of the attribute information output by the quantization unit 430, and perform inverse quantization on the quantized residual value of the attribute information, so as to obtain the residual value of the attribute information of the point in the point cloud. The reconstruction unit 460 obtains the residual value of the attribute information of the point in the point cloud output by the quantization unit 450 and the predicted value of the attribute information of the point in the point cloud output by the prediction unit 410, and adds the residual value and the predicted value of the attribute information of the point in the point cloud, so as to obtain a reconstructed value of the attribute information of the point. The reconstructed value of the attribute information of the point is buffered in the decoding buffer unit 480 after being filtered by the filtering unit 470, and is used for a subsequent predicting process of other points.

At a decoding end, the decoding unit 510 may parse the attribute bitstream to obtain the residual value, the predicted information, the quantization coefficient, and the like of the quantized attribute information in the point cloud. The prediction unit 520 perform prediction to generate the predicted value of the attribute information of the point based on the attribute information of the point in the point cloud. The inverse quantization unit 530 performs inverse quantization on the quantized residual value of the attribute information of the point by using the quantization coefficient obtained from the attribute bitstream, so as to obtain a residual value of the attribute information of the point. The reconstruction unit 440 adds the predicted value and the residual value of the attribute information of the point to obtain the reconstructed value of the attribute information of the point. The filtering unit 550 performs filtering on the reconstructed value of the attribute information of the point to obtain decoded attribute information.

It is to be noted that mode information or parameter information of prediction, quantization, encoding, filtering, and the like determined when encoding the attribute information at the encoding end are carried in the attribute bitstream when necessary. The decoding end determines the same mode information or parameter information of prediction, quantization, encoding, filtering and the like as those of the encoding end by parsing the attribute bitstream and perform analysis according to existing information, so as to ensure that the reconstructed value of the attribute information obtained at the encoding end is the same as the reconstructed value of the attribute information obtained at the decoding end.

The above is a basic process of a point cloud encoder/decoder under a G-PCC encoding/decoding framework. With the development of technology, some modules or steps of the framework or process may be optimized. The present disclosure is applicable to the basic process of the point cloud encoder/decoder under the G-PCC encoding/decoding framework, but is not limited to the framework and process.

Figure 6:
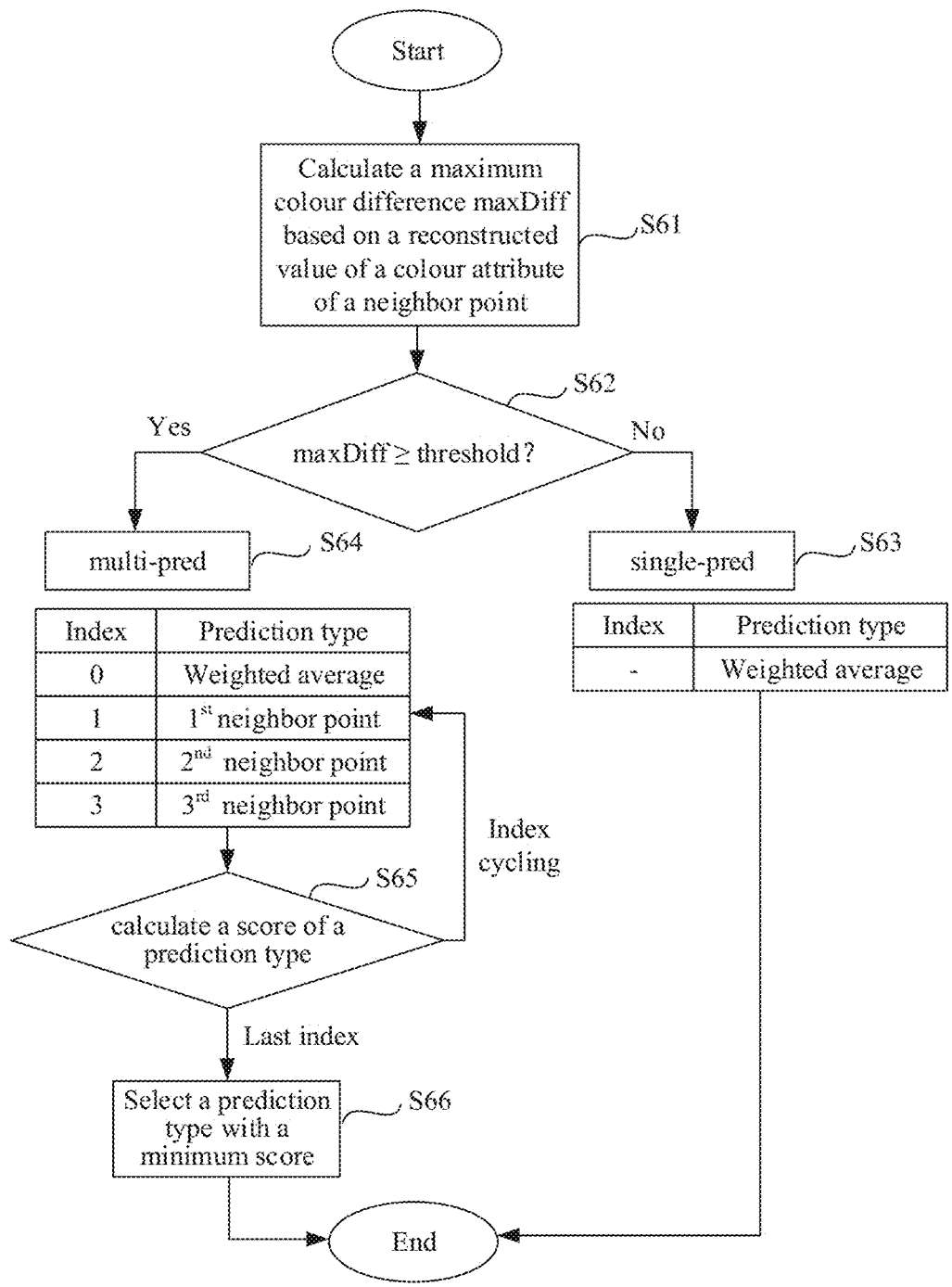
FIG. 6 is a schematic diagram of prediction performed at an encoding end according to an embodiment.

FIG. 6 is a schematic diagram of prediction performed at an encoding end according to an embodiment. As shown in FIG. 6, the following steps are included.

At S61, a reconstructed value, for example, a colour value, of the attribute information of a neighbor point of a current point is obtained, and a maximum colour difference maxDiff of the neighbor point is calculated according to the reconstructed value of the attribute information of the neighbor point.

Specifically, assuming that the current point has 3 neighbor points, namely, a point 1, a point 2, and a point 3 respectively, the colour value of the point 1 is (R1, G1, B1), the colour value of the point 2 is (R2, G2, B2), and the colour value of the point 3 is (R3, G3, B3). Maximum differences of these 3 neighbor points on a component R, a component G, and a component B are calculated, and the maximum difference of the components R, G, and B is selected as the maxDiff.

For example, the maximum colour difference maxDiff corresponding to the above 3 neighbor points is obtained according to the following formula (1).

$$\text{maxDiff}=\max(\max(R_1,R_2,R_3)-\min(R_1,R_2,R_3),\max(G_1,G_2,G_3)-\min(G_1,G_2,G_3),\max(B_1,B_2,B_3)-\min(B_1,B_2,B_3)) \quad (1)$$

At S62, the maxDiff is compared with a preset threshold.

At S63, if the maxDiff is less than the threshold, a target prediction mode of the current point is determined as a single-prediction type mode (single-pred), and the current pont is predicted in a weighted averaging mode. For example, a weighted average value of the reconstructed values of the attribute information of the 3 neighbor points is taken as a predicted value of the attribute information of the current point.

At S64, if the maxDiff is greater than or equal to the threshold, the target prediction mode of the current point is determined as a multi-prediction mode (multi-pred). Specifically, the reconstructed value of the attribute information of each neighbor point of the 3 neighbor points is taken as a prediction type to obtain prediction types of the 3 neighbor points. In addition, a weighted average value of the reconstructed values of the attribute information of the 3 neighbor points is taken as another predicted value, which is recorded as a weighted average prediction type, 3+1 prediction types as shown in a table in FIG. 6 are obtained, and an index is set for each prediction type.

At S65, a score corresponding to each prediction type of the 3+1 prediction types is calculated. For example, the Rate Distortion Optimization (RDO) technology is used to calculate RDO values, each corresponding to a respective prediction type of the 3+1 prediction types.

At S66, the prediction type with a minimum score is determined as an optimal prediction type of the current point, and entropy encoding is performed on the information of the optimal prediction type.

Figure 7:
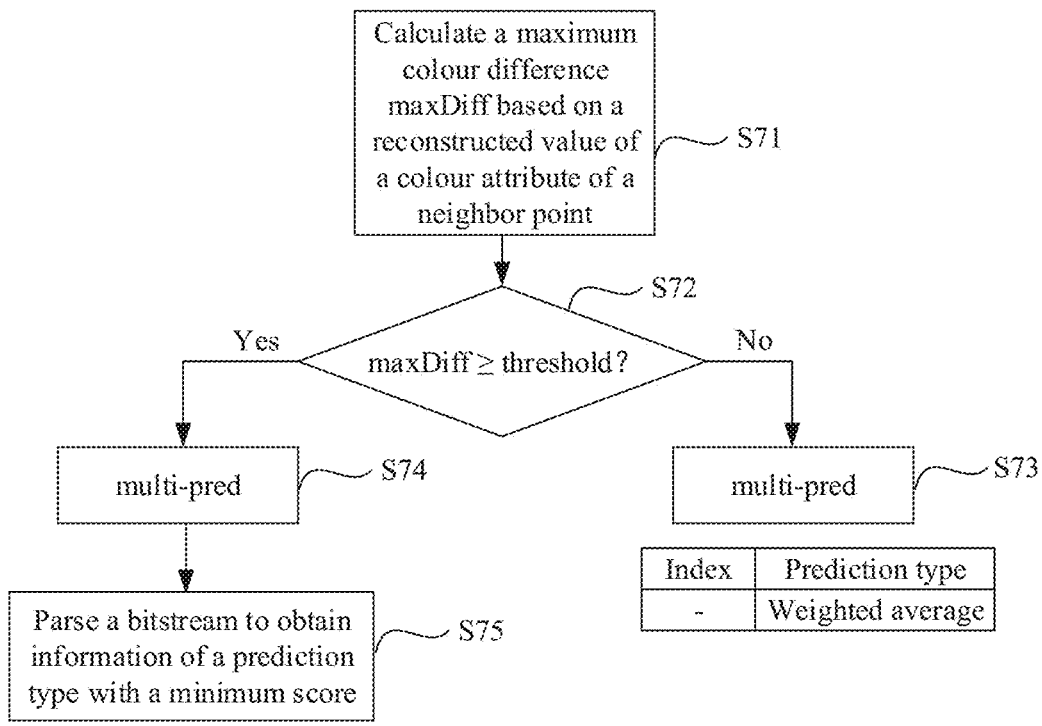
FIG. 7 is a schematic diagram of prediction performed at an decoding end according to an embodiment.

FIG. 7 is a schematic diagram of prediction performed at a decoding end according to an embodiment. As shown in FIG. 7, the following steps are included.

At S71, a bitstream is decoded to obtain attribute information of a neighbor point of a current point, and the attribute information of the neighbor point is decoded to obtain a reconstructed value of the attribute information of the neighbor point; and a maximum colour difference maxDiff of the neighbor point is calculated according to the reconstructed value of the attribute information of the neighbor point, and refer to step 2 in FIG. 6 above for details.

At S72, the maxDiffis compared with a preset threshold.

At S73, if the maxDiff is less than the threshold, then a target prediction mode of the current point is determined as a single-prediction type mode (single-pred), and the current point is predicted in a weighted averaging mode. For example, a weighted average value of the reconstructed values of the attribute information of the 3 neighbor points is taken as a predicted value of the attribute information of the current point.

At S74, if the maxDiff is greater than or equal to the threshold, the target prediction mode of the current point is determined as a multi-prediction mode (multi-pred).

At S75, a bitstream is parsed to obtain the information of the prediction type with the minimum score carried in the bitstream, and the prediction type corresponding to the information of the prediction type is taken as the predicted value of the current point.

It can be known from FIG. 6 and FIG. 7 above that the maximum colour difference maxDiff of the neighbor points of the current point needs to be calculated when determining the predicted value of the attribute information of the current point at present, and whether the current point is predicted by the single-prediction type mode (single-pred) or the multi-prediction mode (multi-pred) is determined according to the maxDiff. This determination process depends on the reconstructed value of the attribute information of the neighbor point of the current point, and a determination process of the prediction mode and a reconstruction process of the attribute information cannot be performed in parallel due to this dependency relationship, and thus, the efficiency of encoding a point cloud is reduced.

In order to solve technical solutions, a prediction mode of attribute information of a current point is determined through geometric information of a point in a point cloud in the present disclosure, so that the process of determining the prediction mode is decoupled from the process of reconstructing the attribute information of the point in the point cloud, the two processes can be performed in parallel, and thus the efficiency of encoding and decoding is improved.

The technical solution according to an embodiment of the present disclosure is described in detail below in combination with specific embodiments.

The encoding end is introduced below in combination with FIG. 8.

Figure 8:
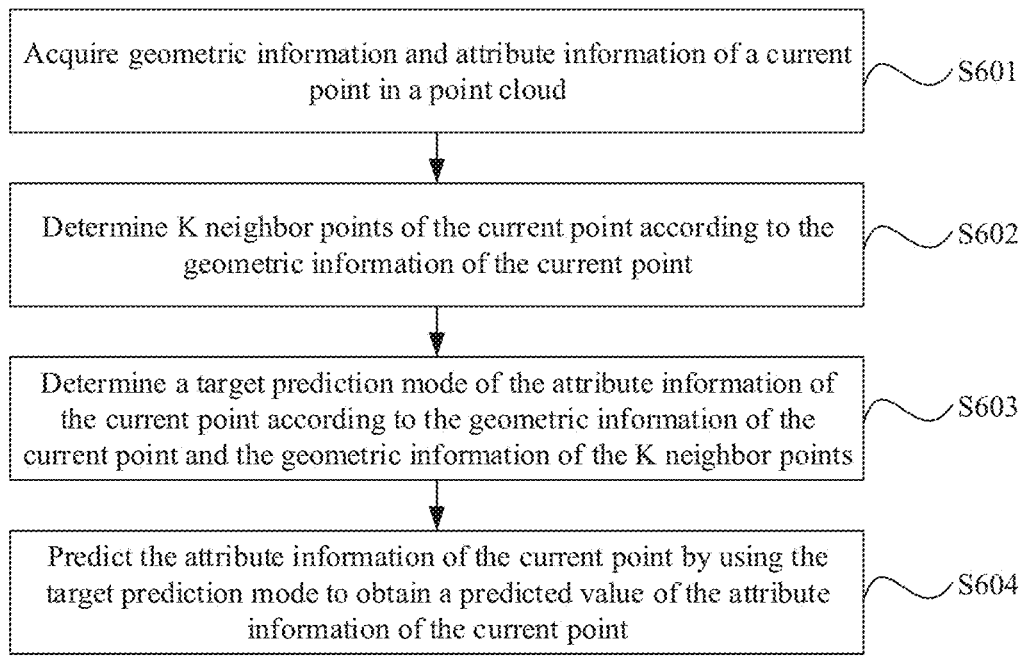
FIG. 8 is a schematic flowchart of a point cloud encoding method 600 according to an embodiment of the present disclosure.

FIG. 8 is a schematic flowchart of a point cloud encoding method 600 according to an embodiment of the present disclosure. The embodiment of the present disclosure is applied to the point cloud encoder as shown in FIG. 1, FIG. 2, and FIG. 4. As shown in FIG. 8, the method of the embodiment of the present disclosure includes the following steps.

At S601, geometric information and attribute information of a current point in a point cloud are acquired.

The point cloud includes a plurality of points. Each point may include geometric information of the point and attribute information of the point. The geometric information of the point may also be referred to as the position information of the point. The position information of the point may be 3D coordinate information of the point. The attribute information of the point may include colour information and/or reflectivity.

The current point may be understood as one point to be encoded currently in the point cloud. In some embodiments, the current point is also referred to as a target point.

In one example, the attribute information of the current point may be original attribute information of the current point.

In another example, as shown in FIG. 2, after the point cloud encoder obtains the original attribute information of the current point, the original attribute information is subjected to colour space transform. For example, the RGB colour space of the current point is transformed into a YCbCr format or other formats. The current point after the colour space transform is subjected to attribute transfer to minimize attribute distortion, so as to obtain the attribute information of the current point.

At S602, K neighbor points of the current point are determined according to the geometric information of the current point. K is a positive integer greater than or equal to 2.

It is to be noted that the point cloud encoder encodes the attribute information of the point in the point cloud after encoding the geometric information of the point in the point cloud. Referring to FIG. 2, in a process of encoding the geometric information, the first arithmetic encoding unit 205 encodes the geometric information of the point after being processed by the octree unit 203 to form a geometric bitstream, and the geometry reconstruction unit 204 reconstructs the geometric information of the point after being processed by the octree unit 203, so as to obtain a reconstructed value of the geometric information.

In some embodiments, K neighbor points of the current point are obtained from the encoded points in the point cloud according to the reconstructed value of the geometric information of the current point.

For example, the geometric information (that is, geometric coordinates) of the point in the point cloud is transformed into a Morton code. Specifically, a fixed value (j1, j2, j3) is added to the geometric information (x, y, z) of the point in the point cloud, and the Morton code of the point is generated by using new coordinates (x+j1, y+j2, z+j3). The points in the point cloud are sorted according to the Morton codes of the points, so as to obtain a Morton order of the points. K neighbor points of the current point are obtained from the encoded points in the point cloud according to the Morton order of the point cloud, where K is a positive integer greater than or equal to 2.

At S603, a target prediction mode of the attribute information of the current point is determined according to the geometric information of the current point and the geometric information of the K neighbor points.

The prediction mode of the attribute information of the points in the point cloud includes the multi-prediction mode (multi-pred) and the single-prediction type mode (single-pred).

The multi-prediction mode (multi-pred) includes K+1 prediction types. K is the number of neighbor points of the current point. The reconstructed value of the attribute information of each neighbor point of the K neighbor points is taken as a prediction type, so as to obtain K prediction types, which are also referred to neighbor point prediction types. A weighted average value of the reconstructed values of the attribute information of the K neighbor points is taken as a (K+1)th prediction type, which may also be referred to a weighted average prediction type.

The single-prediction type mode includes one prediction type, that is, the weighted average prediction type formed by a weighted average value of the reconstructed values of the attribute information of the K neighbor points.

In the present disclosure, whether the target prediction type mode of the attribute information of the current point is the multi-prediction mode (multi-pred) and the single-prediction type mode (single-pred) is determined according to the geometric information of the current point and the geometric information of the K neighbor points.

In some embodiments, the above S603 includes S603-A1 and S603-A2.

At S603-A1, first distances between a neighbor point set composed of the K neighbor points and the current point are determined according to the geometric information of the current point and the geometric information of the K neighbor points.

At S603-A2, the target prediction mode of the attribute information of the current point is determined according to the first distance.

When the distance between the current point and a neighbor point is relatively long, the accuracy is low when the attribute information of the current point is predicted by using the single-prediction type mode (single-pred). Therefore, in the present disclosure, the target prediction mode of the attribute information of the current point may be determined accurately by calculating the first distance between the neighbor point set composed of the K neighbor points and the current point and determining the target prediction mode of the attribute information of the current point according to the first distance, so as to realize accurate prediction of the current point. In addition, in the present disclosure, the prediction mode of the attribute information of the current point is determined by the first distance between the neighbor point set composed of the K neighbor points and the current point, so that the process of determining the prediction mode is decoupled from the process of reconstructing the attribute information of the point in the point cloud, the two processes can be performed in parallel, and thus the efficiency of encoding is improved.

At S603-A1 above, methods for determining the first distance between the neighbor point set composed of the K neighbor points and the current point include, but are not limited to, the following: method 1 and method 2.

In method 1, geometric information of a geometric centroid of the neighbor point set is determined according to the geometric information of the K neighbor points, and a second distance between the current point and the geometric centroid is determined according to the geometric information of the current point and the geometric information of the geometric centroid; and a first distance is determined according to the second distance. For example, the second distance is taken as the first distance, or a corresponding operation (for example, a rounding operation) is performed on the second distance, and an operation result is taken as the first distance.

For example, assuming that K is 3, that is, the current point has 3 neighbor points, recorded as P1, P2, and P3. The geometric information of P1 is (x1, y1, z1), the geometric information of P2 is (x2, y2, z2), and geometric information of P3 is (x3, y3, z3). The geometric information of the geometric centroid C of the neighbor point set composed of P1, P2, and P3 is an average value of the geometric information of P1, P2, and P3. The geometric information ($\bar{x}, \bar{y}, \bar{z}$) of a geometric centroid C is obtained according to the following formula (2).

$$\begin{cases} \bar{x} = \dfrac{x_1 + x_2 + x_3}{3} \\ \bar{y} = \dfrac{y_1 + y_2 + y_3}{3} \\ \bar{z} = \dfrac{z_1 + z_2 + z_3}{3} \end{cases} \quad (2)$$

Assuming that the geometric information of the current point P0 is (x, y, z), the second distance between the current point P0 and the geometric centroid C is determined according to the geometric information of the current point P0 and the geometric information of the geometric centroid C.

In one example, the second distance between the current point P0 and the geometric centroid C is a Euclidean distance between the current point P0 and the geometric centroid C. For example, the second distance PmaxDiff between the current point P0 and the geometric centroid C is determined according to the following formula (3).

$$P\text{maxDiff} = \sqrt{(x-\bar{x})^2 + (y-\bar{y})^2 + (z-\bar{z})^2} \quad (3)$$

For example, the encoder executes the following programs to obtain the Euclidean distance between the current point P0 and the geometric centroid C.

```
int64_t sumDistance = 0;
if (predictor.neighborCount > 2 &&
aps.max_num_direct_predictors) {
  auto position = pointCloud.getPosition(indexes[predictorIndex]);
  auto position1 =
pointCloud.getPosition(indexes[predictor.neighbors[0].predictorIndex]);
  auto position2 =
pointCloud.getPosition(indexes[predictor.neighbors[1].predictorIndex]);
  auto position3 =
pointCloud.getPosition(indexes[predictor.neighbors[2].predictorIndex]);
  Vec3<int32_t> neighborCentroid;
  for (int i= 0; i < 3; ++i) {
```

```
neighborCentroid[i] = (position1[i] + position2[i] + position3[i]) / 3;
}
for (int i=0; i < 3; ++i) {
sumDistance += (position[i] - neighborCentroid[i])
    (position[i] - neighborCentroid[i]);
}
}
int64_t maxDiff = std::sqrt(sumDistance).
```

In one example, the second distance between the current point P0 and the geometric centroid C is a Manhattan distance between the current point P0 and the geometric centroid C. For example, the second distance PmaxDiff between the current point P0 and the geometric centroid C is determined according to the following formula (4).

$$P\text{maxDiff} = |x - \bar{x}| + |y - \bar{y}| + |z - \bar{z}| \tag{4}$$

In method 2, for each neighbor point of the K neighbor points, a third distance between the neighbor point and the current point is determined according to the geometric information of the neighbor point and the geometric information of the current point; and an average value of the third distances between the K neighbor points and the current point is taken as the first distance.

Specifically, assuming that the geometric information of the current point 0 is (x, y, z), the first distance QmaxDiff between the neighbor point set composed of the K neighbor points and the current point is determined according to the following formula (5).

$$Q\text{maxDiff} = \frac{1}{K}\sum_{i=1}^{K}\sqrt{(x-x_i)^2 + (y-y_i)^2 + (z-z_i)^2} \tag{5}$$

Where $(x_i, y_i, z_i)$ is geometric information of an $i^{th}$ neighbor point of the K neighbor points.

The above S603-A2 is performed after the first distances between the current point and the neighbor point set are determined according to the above method, and the target prediction mode of the attribute information of the current point is determined according to the first distances.

In some embodiments, the above S603-A2 includes the following S603-A21 and S603-A22.

At S603-A21, the target prediction mode is determined as a multi-prediction mode in a case that the first distance is greater than or equal to a first value.

At S603-A22, the target prediction mode is determined as a single-prediction type mode in a case that the first distance is less than the first value.

In the present disclosure, it indicates that the distance between the current point and the neighbor point is relatively long in a case that the first distance is greater than or equal to the first value. At this moment, the prediction accuracy may be improved by predicting the attribute information of the current point in the multi-prediction mode. It indicates that the distance between the current point and the neighbor point is relatively short in a case that the first distance is less than the first value, the attribute information of the current point may be predicted in the single-prediction type mode, and a prediction process is simple.

In a possible implementation, the above first value is a preset threshold value.

In a possible implementation, the point cloud encoder determines the first value by performing the following step A to step C.

At step A, a bounding box of the point cloud is obtained according to the geometric information of the points in the point cloud. The bounding box is used for enclosing the point cloud. For example, the bounding box may be understood as a cuboid enclosing a point cloud. The length, the width, and the height of the bounding box are difference values between a maximum value and a minimum value of the points of the point cloud on X, Y, Z coordinate axes respectively. For example, the length of the bounding box is a difference value between a maximum value and a minimum value of the point of the point cloud on an X coordinate axis, the width of the bounding box is a difference value between a maximum value and a minimum value of the point of the point cloud on a Y coordinate axis, and the height of the bounding box is a difference value between a maximum value and a minimum value of the point of the point cloud on a Z coordinate axis. That is, the bounding box may be understood as a smallest cuboid that encloses the point cloud, and the length, the width, and the height of the bounding box are recorded as 3 sides of the bounding box.

At step B, a length of a first side of the bounding box of the point cloud is obtained. The first side may be any side of the bounding box of the point cloud. For example, the first side is the shortest side of the bounding box, or the longest side of the bounding box.

At step C, the first value is determined according to the length of the first side.

In the above step C, methods for determining the first value according to the length of the first side include, but are not limited to, the following method 1 and method 2.

In method 1, a ratio of the length of the first side to a preset value is determined as the first value. The preset value may be determined according to the actual needs.

In method 2, the above step C includes the following step C1 and step C2.

At step C1, a quantization parameter (QP) is acquired.

At step C2, the first value is determined according to the QP and the length of the first side.

Since the QP is correlated with the selection of the target prediction mode of the current point, for example, when the QP is large and attribute prediction is performed on the current point by using the multi-prediction mode, the prediction effect is poor. In this case, the attribute information of the current point is often predicted by using the single-prediction type mode. On this basis, in the present disclosure, the first value is determined through the QP and the length of the first side, so that the determined first value is correlated with the QP. In this way, the influence of the QP may be considered when the target prediction mode of the current point is determined based on the first value subsequently, so that the accuracy of determining the target prediction mode is improved.

In the above step C2, methods for determining the first value according to the QP and the length of the first side include, but are not limited to, the following method 1 and method 2.

In method 1, a ratio of the length of the first side to the QP is taken as the first value.

For example, the first value is determined according to the following formula (6).

$$\text{geometryThreshold} = \text{minimumbBoxLength} \div QP \tag{6}$$

Where geometryThreshold is the first value, minimumbBoxLength is the length of the first side, and the above formula (6) shows that the first side is the shortest side of the bounding box.

In method 2, a first ratio of the length of the first side to a first preset value is obtained; a second ratio of the QP to the second preset value is obtained; and the first value is determined according to the first ratio and the second ratio. For example, the first ratio is shifted to the left by a rounded digit of the second ratio to obtain the first value.

In one example, the first value is determined according to the following formula (7).

$$\text{geometryThreshold} = (\text{minimumbBoxLength} \div T1) << \lceil QP \div T2 \rceil \quad (7)$$

Where T1 is the first preset value, T2 is the second preset value, $\lceil QP \div T2 \rceil$ is the QP divided by the second preset value T2 and rounded up, "<<" represents shifting to the left, and shifting to the left by 1 digit is equivalent to multiplying by 2.

In another example, the first value is determined according to the following formula (8).

$$\text{geometryThreshold} = (\text{minimumbBoxLength} >> T3) << \lceil QP \div T2 \rceil \quad (8)$$

Where $2^{T3}$ is equal to the first preset value T1, for example, T1 is 64, T3 is 6, ">>" represents shifting to the right, and shifting to the right by 1 digit is equivalent to dividing by 2.

Optionally, the first preset value T1 is greater than the second preset value T2.

Optionally, the second preset value is T2=6.

Optionally, the first preset value is 64 in a case that the first side is the shortest side of the bounding box.

Optionally, the first preset value is 128 in a case that the first side is the longest side of the bounding box.

In the present disclosure, after the first value is determined by the above method, the first value is compared with the first distance between the current point and the neighbor point set. If the first distance is greater than or equal to the first value, the target prediction mode of the current point is determined as the multi-prediction mode. If the first distance is less than the first value, the target prediction mode of the current point is determined as the single-prediction type mode. Next, the following S604 is performed.

At S604, the attribute information of the current point is predicted by using the target prediction mode to obtain a predicted value of the attribute information of the current point.

At S605, a residual value of the attribute information of the current point is obtained according to the predicted value of the attribute information of the current point. For example, a difference value between an original value and the predicted value of the attribute information of the current point is taken a residual value of the attribute information of the current point.

At S606, the residual value of the attribute information of the current point is encoded to obtain a point cloud bitstream.

The above S604 includes the following two cases.

Case 1, if the target prediction mode of the current point is determined as the multi-prediction mode, then the above S604 includes the following S604-A1 to S604-A5.

At S604-A1, reconstructed values of the attribute information of the K neighbor points are obtained.

At S604-A2, the reconstructed values of the attribute information of the K neighbor points are taken as K prediction types.

At S604-A3, a weighted average value of the reconstructed values of the attribute information of the K neighbor points is taken as a $(K+1)^{th}$ prediction type.

At S604-A4, RDO values of K+1 prediction types are determined.

At S604-A5, a prediction type with a minimum RDO value is taken as a predicted value of the attribute information of the current point.

For example, assuming K=3, that is, the current point includes 3 neighbor points, namely, P1, P2, and P3 respectively. These 3 neighbor points are all encoded points. As shown in FIG. 4, reconstructed values of the attribute information thereof are stored in a decoding buffer unit 480. The point cloud encoder may obtain the reconstructed values of the attribute information of the 3 neighbor points from the decoding buffer unit 480, which are used for predicting the attribute information of the current point. For example, the reconstructed value of the attribute information of each neighbor point of the 3 neighbor points is taken as a prediction type of the current point, to obtain 3 prediction types. In addition, an average value of the reconstructed values of the attribute information of the 3 neighbor points is taken as another prediction type of the current point. In this way, the current point has 3+1 prediction types in total, as shown in Table 1.

TABLE 1

| Indexes | Prediction types |
| --- | --- |
| 0 | Weighted average |
| 1 | 1st neighbor |
| 2 | 2st neighbor |
| 3 | 3rd neighbor |

It can be known from the Table 1 that, the above 3+1 prediction types correspond to 3+1 prediction modes. The first prediction mode is the reconstructed value of the attribute information of the first neighbor point, that is, a prediction mode corresponding to the first prediction type, and the index thereof is 1. The second prediction mode is the reconstructed value of the attribute information of the second neighbor point, that is, a prediction mode corresponding to the second prediction type, and the index thereof is 2. The third prediction mode is the reconstructed value of the attribute information of the third neighbor point, that is, a prediction mode corresponding to the thirds prediction type, and the index thereof is 3. The fourth prediction mode is an average of the reconstructed values of the attribute information of the 3 neighbor points, that is, a prediction mode corresponding to the fourth prediction type, and the index thereof is 0. The first neighbor point is the neighbor point that is closest to the current point of the above 3 neighbor points, the second neighbor point is the neighbor point that is the second closest to the current point of the 3 neighbor points, and the third neighbor point is the neighbor point that is the farthest away from the current point of the 3 neighbor points.

The RDO value corresponding to each prediction type of the above 3+1 prediction types is calculated, and the prediction type with a minimum RDO is taken as the predicted value of the attribute information of the current point, for example, the prediction type with the minimum RDO is the reconstructed value of the attribute information of the point P2.

In one example, when determining the RDO, a reciprocal of a distance (for example, a Euclidean distance) between a neighbor point and the current point may be taken as a weight of the neighbor point.

In case 1, in order to quickly and accurately determine the predicted value of the current point at the decoding end, the prediction mode information corresponding to the prediction type with the smallest RDO value determined above can be carried in the point cloud bitstream, so that the decoding end may directly parse the prediction mode information corresponding to the current point from the point cloud bitstream, and determine the predicted value of the current point by using the prediction type indicated by the prediction mode information. For example, the prediction type with the smallest RDO value determined above is the reconstructed value of the attribute information of point P2, and the corresponding index thereof is 2, and the index 2 may be carried in the point cloud bitstream. A decoding end may directly parse the index 2 from the point cloud bitstream, and predict the attribute information of the current point by using the reconstructed value of the attribute information of the point P2 corresponding to the index 2, for example, taking the reconstructed value of the attribute information of the point P2 as the predicted value of the attribute information of the current point.

In case 2, if the target prediction mode of the current point is determined as the single-prediction type mode, then the above S604 includes the following S604-B1 to S604-B2.

At S604-B1, reconstructed values of the attribute information of the K neighbor points are obtained.

At S604-B2, a weighted average value of the reconstructed values of the attribute information of the K neighbor points is taken as a predicted value of the attribute information of the current point.

For example, assuming K=3, that is, the current point has 3 neighbor points, namely, P1, P2, and P3 respectively. Reconstructed values of the attribute information of the 3 points are obtained, and a weighted average value of the reconstructed values of the attribute information of the 3 neighbor points is taken as a predicted value of the attribute information of the current point.

In one example, when determining the weighted average value of the construction values, a reciprocal of a distance (for example, a Euclidean distance) between a neighbor point and the current point may be taken as a weight of the neighbor point.

When the target prediction mode of the current point is the multi-prediction mode, as shown in Table 2, the prediction type includes the weighted average value, and the corresponding index thereof may be blank.

TABLE 2

| Index | Prediction type |
|---|---|
| — | Weighted average |

That is, when the target prediction mode of the current point is the single-prediction type mode, the point cloud bitstream may not carry the prediction mode information corresponding to the current point. In this way, when the prediction mode information corresponding to the current point cannot be parsed from the point cloud bitstream at the decoding end, the target prediction mode of the current point at the encoding point is the single-prediction type mode by default, and then the decoding end also predicts the attribute information of the current point by using the single-prediction type mode. Therefore, the consistency of the decoding end and the encoding end is ensured.

Figure 9:
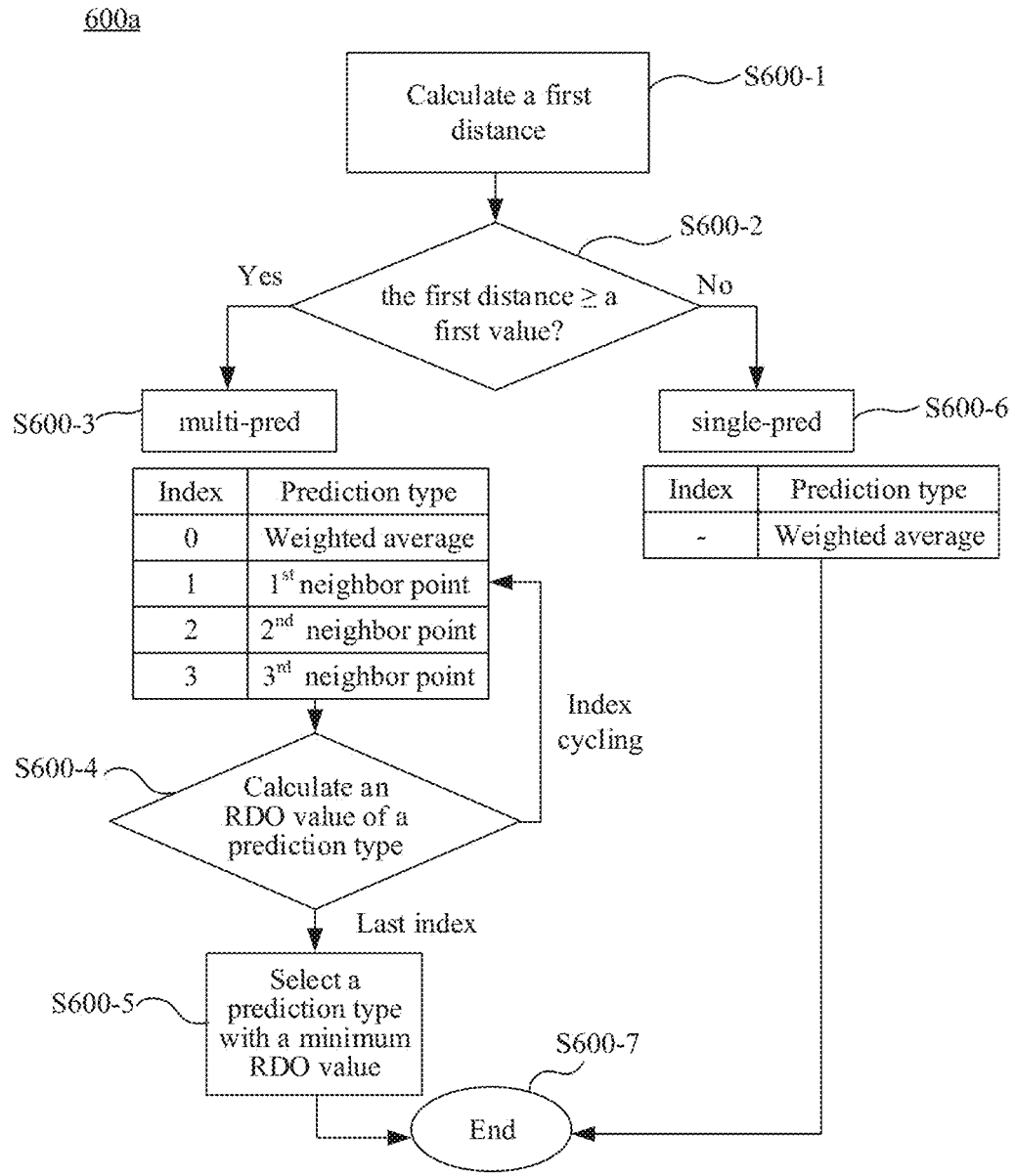
FIG. 9 is a schematic flowchart of a point cloud encoding method 600a according to an embodiment of the present disclosure.

In a specific embodiment, as shown in FIG. 9, a prediction process 600a of the encoding end includes the following steps.

At S600-1, the first distance between the current point and the neighbor point set composed of 3 neighbor points is calculated. It is to be noted that the present disclosure is described by taking 3 neighbor points as an example, a quantity of the neighbor points of the current point includes, but is not limited to, 3, and may also be 2, 4, 5, or the like. Not limits are made thereto in the present disclosure.

At S600-2, whether the first distance is greater than or equal to the first value is determined, step S600-3 is performed if the first distance is greater than or equal to the first value, and S600-4 is performed if the first distance is less than the first value.

At S600-3, the target prediction mode of the current point is a multi-prediction mode (multi-pred).

At S600-4, the RDO value corresponding to each prediction type is calculated. Specifically, the RDO value corresponding to a weighted average prediction type corresponding to the index 0 is calculated first, and whether the current index is the last index is determined. If the current index is not the last index, the index is cycled, and the ROD value corresponding to the prediction type corresponding to the next index is calculated until the last index. In this way, the RDO value corresponding to each prediction type may be calculated through cycling.

At S600-5, the prediction type with a minimum RDO value is selected as a predicted value of the attribute information of the current point, and S600-7 is performed.

S600-6, the single-prediction type mode (multi-pred) of the current point is determined, a weighted average value of the attribute information of the neighbor point is taken as the predicted value of the attribute information of the current point, and S600-7 is performed.

S600-7, the operation is ended.

Here, the prediction process of the present disclosure shown in FIG. 9 is compared with the prediction process of the existing technology shown in FIG. 6 above. In the present disclosure, the first distance between the current point and the neighbor point set is determined according to the geometrical information of the current point and the geometrical information of the neighbor point. The first distance is compared with the first value, whether the multi-prediction mode or the single-prediction type mode is used for predicting the attribute information of the current point is determined, so that a process of selecting the prediction mode of the current point is related to the geometrical information of the point in the point cloud, and is decoupled from the process of reconstructing the attribute information of the neighbor point, so that the process of selecting the prediction mode and the process of reconstructing the attribute information may be performed in parallel, and thus the efficiency of encoding is improved.

Figure 10:
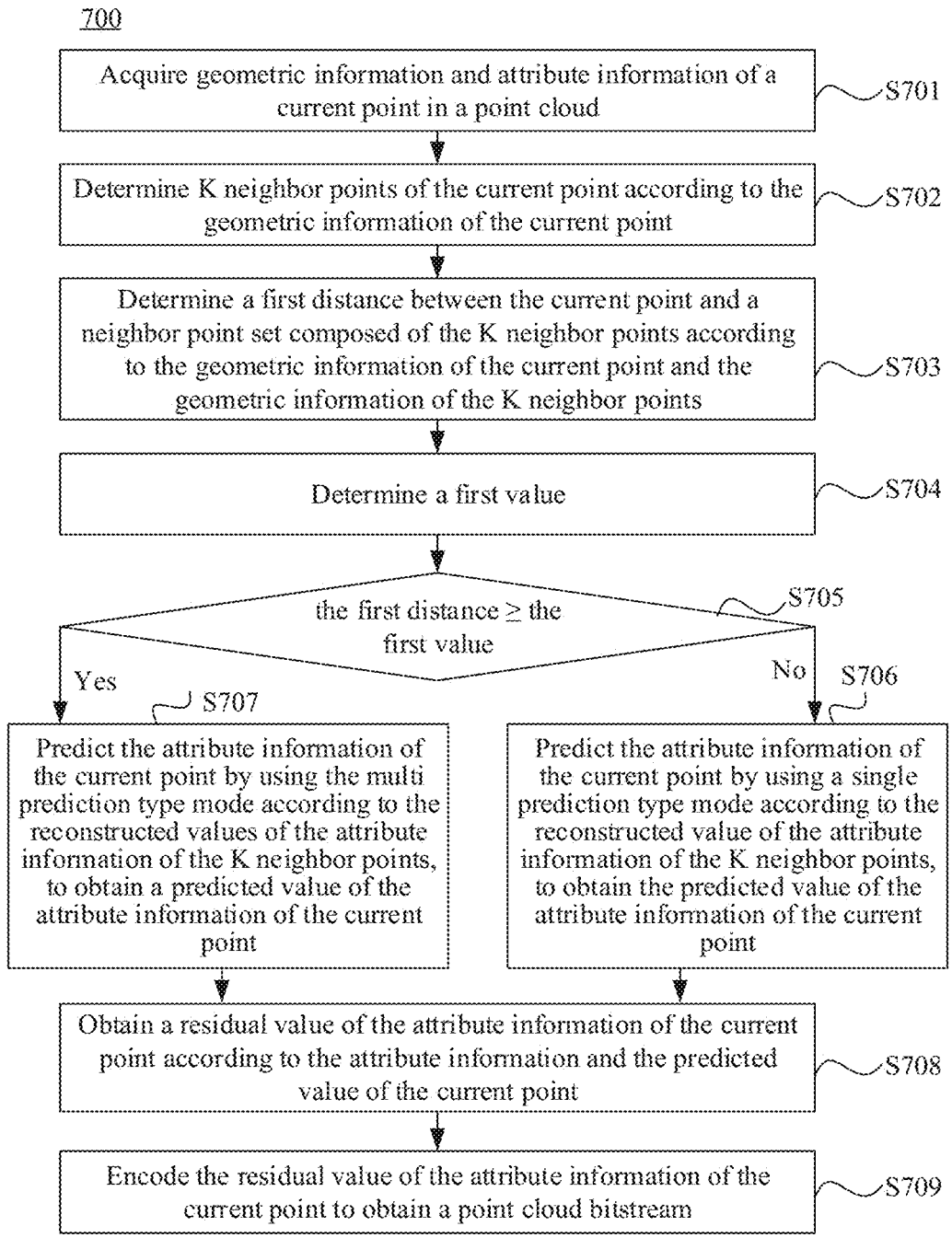
FIG. 10 is a schematic flowchart of a point cloud encoding method 700 according to an embodiment of the present disclosure.

FIG. 10 is a schematic flowchart of a point cloud encoding method 700 according to an embodiment of the present disclosure. On the basis of the above embodiments, as shown in FIG. 10, the method of the embodiment of the present disclosure includes the following steps.

At S701, geometric information and attribute information of a current point in a point cloud are acquired.

At S702, K neighbor points of the current point are determined according to the geometric information of the current point. K is a positive integer greater than or equal to 2.

Specific implementation processes of the above S701 to S702 may refer to the description of the above S601 and S602, which will not be elaborated herein.

At S703, a first distance between a neighbor point set composed of the K neighbor points and the current point is determined according to the geometric information of the current point and the geometric information of the K neighbor points. A specific implementation process may refer to the related description of the above S603-A1, which will not be elaborated herein.

At S704, a first value is determined, and specific reference is made to the description of the above S603-A22. For example, a bounding box of the point cloud is obtained according to the geometric information of the points in the point cloud, a length of a first side of the bounding box of the point cloud is obtained, and the first value is determined according to the length of the first side and the QP.

It is to be noted that the execution order of the above S703 and S704 is not fixed. S704 may be performed before the above S703, or may be performed after the above S703, or may be performed simultaneously with the above S703. Not limits are made thereto in the present disclosure.

At S705, whether the first distance is greater than or equal to the first value is determined, step S707 is performed if the first distance is greater than or equal to the first value, and S706 is performed if the first distance is less than the first value.

At S706, if the first distance is less than the first value, the attribute information of the current point is predicted by using the single-prediction type mode according to the reconstructed value of the attribute information of the K neighbor points to obtain the predicted value of the attribute information of the current point. For example, an average of the reconstructed values of the attribute information of the K neighbor points is taken as the predicted value of the attribute information of the current point.

At S707, if the first distance is greater than or equal to the first value, the attribute information of the current point is predicted by using the multi prediction type mode according to the reconstructed values of the attribute information of the K neighbor points to obtain a predicted value of the attribute information of the current point. For example, the RDO values corresponding to the K+1 prediction types are calculated, and the prediction type with the minimum RDO value is taken as a predicted value of the attribute information of the current point.

At S708, a residual value of the attribute information of the current point is obtained according to the attribute information and the predicted value of the current point.

At S709, the residual value of the attribute information of the current point is encoded to obtain a point cloud bitstream. When the target prediction mode of the current point is the multi-prediction mode, the point cloud bitstream includes the residual value of the attribute information of the current point and the prediction mode information corresponding to the prediction type with the minimum RDO value. Optionally, the prediction mode information is located after the residual value.

In order to further describe the technical effects of the present disclosure, after the technical solution of the present disclosure is realized on reference software TMC13 V11.0 of G-PCC, part point cloud test sets (cat1-A and cat1-B) required by the Moving Picture Experts Group (MPEG) is tested under the test condition of Common Test Configuration (CTC) CY Test results are as shown in the following Table 1.

TABLE 3

| CY_ai | End to end BD-AttrRate[%] | | |
|---|---|---|---|
| | Luma component component (Cr) | Chroma component (Cb) | Chroma |
| cat1-A | 1.4% | 1.4% | 1.4% |
| cat1-B | 1.6% | 1.5% | 1.4% |
| Average value | 1.5% | 1.5% | 1.4% |

Where CY_ai is a test condition, which represents a test condition that represents geometric losslessness and attribute proximity to losslessness, a point in a cat1-A point cloud set includes colour attribute information and other attribute information, for example, reflectivity attribute information, and a point in a cat1-B point cloud test set only includes colour attribute information. BD-AttrRate is one of the main parameters for evaluating the performance of a video encoding algorithm, which represents the change of the video encoded by using a new algorithm relative to that encoded by using the original algorithm in terms of code rate and Peak Signal to Noise Ratio (PSNR). That is, the change of code rate between the new algorithm and the original algorithm under the same signal to noise ratio. As shown in Table 1, for the cat1-A point cloud test set, compared with the conventional technology, by using the technical solution of the present disclosure, the code rate on the luma component is only increased by 1.4%, the code rate on the chroma component Cb is only increased by 1.4%, and the code rate on the chroma component Cr is only increased by 1.4%. An "average value" represents the average value of the code rate change of the cat1-A point cloud test set and the cat1-B point cloud test set.

It can be known from the above Table 1 that the problem that the determination of the prediction mode and the reconstruction of the attribute information cannot be decoupled in the existing technology is solved by the technical solution of the present disclosure with a relatively small performance distortion cost.

The point cloud encoding method involved in the embodiment of the present disclosure is described above. On this basis, the point cloud decoding method involved in the embodiment of the present disclosure is described below for a decoding end.

Figure 11:
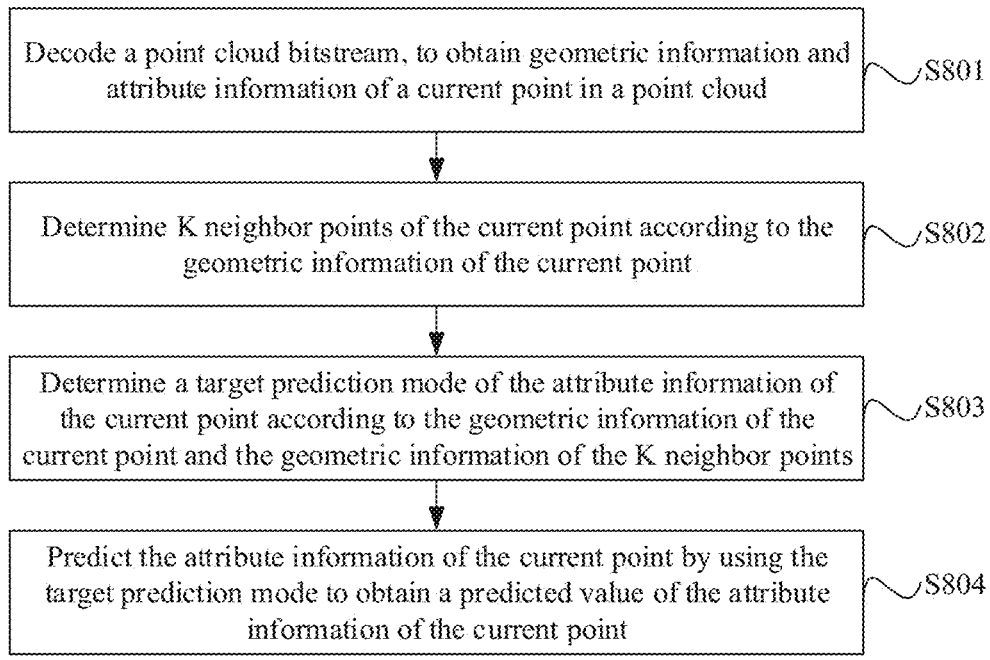
FIG. 11 is a schematic flowchart of a point cloud decoded method 800 according to an embodiment of the present disclosure.

FIG. 11 is a schematic flowchart of a point cloud decoding method 800 according to an embodiment of the present disclosure. As shown in FIG. 11, the method of the embodiment of the present disclosure includes the following steps.

At S801, a point cloud bitstream is decoded, to acquire geometric information and attribute information of a current point in a point cloud.

It is to be noted that the decoding of attribute information of the point in the point cloud is performed after the decoding of the geometric information of the point in the point cloud is completed. After the decoding of a geometric bitstream is completed, geometric information of the point in the point cloud may be obtained.

The point cloud bitstream includes an attribute bitstream and a geometric bitstream. Geometric information of the current point may be obtained by decoding the geometric bitstream, and attribute information of the current point may be obtained by decoding the attribute bitstream.

At S802, K neighbor points of the current point are determined according to the geometric information of the current point. K is a positive integer greater than or equal to 2.

Specifically, the K neighbor points that are closest to the current point are acquired from the points with decoded attribute information in the point cloud according to the geometric information of the current point. A specific implementation process of S802 may refer to the description of the above S602, which will not be elaborated herein.

At S803, a target prediction mode of the attribute information of the current point is determined according to the geometric information of the current point and the geometric information of the K neighbor points.

In some embodiments, the above S803 includes the following S803-A1 and S803-A2.

At S803-A1, a first distance between a neighbor point set composed of the K neighbor points and the current point is determined according to the geometric information of the current point and the geometric information of the K neighbor points.

At S803-A2, the target prediction mode of the attribute information of the current point is determined according to the first distance.

In the above S803-A1, methods for determining the first distance between the neighbor point set composed of the K neighbor points and the current point is determined according to the geometric information of the current point and the geometric information of the K neighbor points include, but are limited to, the following method 1 and method 2.

In method 1, the above S803-A1 includes S803-A11 and S803-A12.

In S803-A11, geometric information of a geometric centroid of the neighbor point set is determined according to the geometric information of the K neighbor points.

In S803-A12, a second distance between the current point and the geometric centroid is determined according to the geometric information of the current point and the geometric information of the geometric centroid.

For example, the second distance between the current point and the geometric centroid is a Euclidean distance between the current point and the geometric centroid.

For example, the second distance between the current point and the geometric centroid is a Manhattan distance between the current point and the geometric centroid.

At S803-A13, the first distance is determined according to the second distance. For example, the second distance is taken as the first distance.

In method 2, the above S803-A1 includes S803-A13 and S803-A14.

At S803-A13, for each neighbor point of the K neighbor points, a third distance between the neighbor point and the current point is determined according to the geometric information of the neighbor point and the geometric information of the current point.

At S803-A14, an average value of the third distances between each neighbor point of the K neighbor points and the current point is taken as the first distance.

In some embodiments, the above S803-A2 includes the following S803-A21 and S803-A22.

At S803-A21, the target prediction mode is determined as a multi-prediction mode in a case that the first distance is greater than or equal to a first value.

At S803-A22, the target prediction mode is determined as a single-prediction type mode in a case that the first distance is less than the first value.

In one example, the above first value is a preset threshold value.

In another example, the point cloud encoder determines the first value by performing the following step D1 to step D4.

At step D1, the point cloud bitstream is decoded to obtain geometric information of the point in the cloud point. Specifically, a geometric bitstream of the point cloud is decoded to obtain geometric information of the point in the point cloud.

At step D2, a bounding box of the point cloud is obtained according to the geometric information of the point in the point cloud. The bounding box may be understood as a smallest cuboid that encloses the point cloud.

At step D3, a length of a first side of the bounding box of the point cloud is obtained. The first side is any side of the bounding box, for example, the shortest side of the bounding box, or the longest side of the bounding box.

At step D4, the first value is determined according to the length of the first side.

In some embodiments, in the above step D4, determination of the first value according to the length of the first side includes the following step D41 and step D42.

At step D41, the point cloud bitstream is decoded to acquire a QP. It is to be noted that the encoding end encodes the QP in an attribute parameter set, the attribute parameter set will be encoded into the point cloud bitstream, and the decoding end decodes the attribute parameter set to acquire the QP.

At step D42, the first value is determined according to the QP and the length of the first side.

In the above step D42, methods for determining the first value according to the QP and the length of the first side include, but are not limited to, the following method 1 and method 2.

In method 1, a ratio of the length of the first side to the QP is taken as the first value.

In method 2, a first ratio of the length of the first side to a first preset value is obtained; a second ratio of the QP to the second preset value is obtained; and the first value is determined according to the first ratio and the second ratio. For example, the first ratio is shifted to the left by a rounded digit of the second ratio to obtain the first value.

In one example, the first value is determined according to the following formula.

$$\text{geometryThreshold} = (\text{minimumbBoxLength} \div T1) \\ << \lceil QP \div T2 \rceil,$$

Where, geometryThreshold is the first value, the minimumbBoxLength is the length of the first side, T1 is the first preset value, T2 is the second preset value, and $\lceil QP \div T2 \rceil$ represents rounding up the QP divided by a second preset value T2.

In one example, the first value is determined according to the following formula.

$$\text{geometryThreshold} = (\text{minimumbBoxLength} >> T3) \\ << \lceil QP \div T2 \rceil,$$

Where, $2^{T3}$ is equal to the first preset value T1.

Optionally, the first preset value T1 is greater than the second preset value T2.

Optionally, the second preset value is T2=6.

Optionally, the first preset value is 64 in a case that the first side is the shortest side of the bounding box.

Optionally, the first preset value is 128 in a case that the first side is the longest side of the bounding box.

At S804, the attribute information of the current point is predicted by using the target prediction mode to obtain a predicted value of the attribute information of the current point.

In the present disclosure, when the target prediction mode of the current point is the multi-prediction mode, the prediction mode information corresponding to the current point is parsed from the point cloud bitstream. When the target prediction mode of the current point is the single-prediction type mode, the prediction mode information corresponding to the current point is not parsed from the point cloud bitstream, and the predicted value of the attribute information of the current point is predicted by using the single-prediction type mode by default. The following two cases are included specifically.

In case 1, if the target prediction mode is the multi-prediction mode, then the above S804 includes the following S804-A1 to S804-A3.

At S804-A1, the point cloud bitstream is decoded to obtain prediction mode information of the attribute information of the current point.

At S804-A2, a reconstructed value of the attribute information of a target neighbor point corresponding to the prediction mode information in the K neighbor points is obtained.

At S804-A3, the reconstructed value of the attribute information of the target neighbor point is taken as the predicted value of the attribute information of the current point.

It can be known from the technical solution of the above encoding end that when the target prediction mode of the current point is determined as a multi prediction type mode, the prediction mode information corresponding to the prediction type with the smallest ROD value is carried in the attribute bitstream and is transmitted to the decoding end.

The decoding end first parses the geometric bitstream of the point cloud to obtain the geometric information of each point in the point cloud, and obtains the K neighbor points that are closest to the current point according to the geometric information of the points in the point cloud. The first distance between the current point and the neighbor point set composed of the K neighbor points is obtained according to the geometric information of the K neighbor points and the geometric information of the current point. If the first distance is greater than or equal to the first value, the target prediction mode of the current point is determined as the multi-prediction mode. At this moment, the decoding end parses the attribute code steam of the point cloud to obtain the prediction mode information of the attribute information of the current point carried in the attribute bitstream. The prediction mode information may be an index value in the above Table 1, for example, the index value included in the prediction mode information is 2, then it indicates that the reconstructed value of the attribute information of a second neighbor point P2 is taken as the predicted value of the attribute information of the current point at the encoding end. In order to facilitate description, the second neighbor point P2 is recorded as the target neighbor point here. On this basis, the decoding end obtains the reconstructed value of the attribute information of the target neighbor point P2 corresponding to the prediction mode information from the decoded point cloud, and takes the reconstructed value of the attribute information of the target neighbor point as the predicted value of the attribute information of the current point.

It is to be noted that the prediction mode information of the attribute information of the current point and the residual value of the attribute information of the current point are encoded jointly, for example, the prediction mode information is located behind the residual value. In this way, the prediction mode information of the current point may be obtained when the residual value of the current point is obtained by decoding the bitstream.

In case 2, if the target prediction mode is the single-prediction type mode, then the above S804 includes the following S804-B1 to S804-B2.

At S804-B1, reconstructed values of the attribute information of the K neighbor points are obtained.

At S804-B2, a weighted average value of the reconstructed values of the attribute information of the K neighbor points is taken as a predicted value of the attribute information of the target point.

The points in the K neighbor points are decoded points in the point cloud. As shown in FIG. 5, the reconstructed values of the attribute information of the decoded points are stored in a decoding buffer unit 560. The decoder may obtain the reconstructed values of the attribute information of the K neighbor points from the decoding buffer unit 560. The weighted average value of the reconstructed values of the attribute information of the K neighbor points is taken as a predicted value of the attribute information of the target point.

In one example, when determining the weighted average value of the reconstructed values, a reciprocal of a distance (for example, a Euclidean distance) between the neighbor point and the current point is taken as a weight of the neighbor point.

Figure 12:
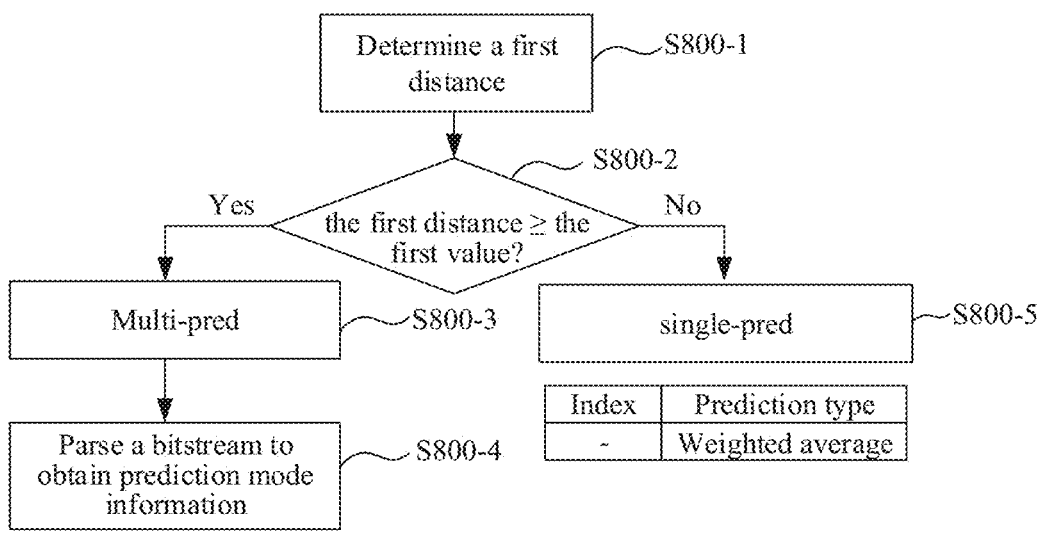
FIG. 12 is a schematic flowchart of a point cloud decoding method 800a according to an embodiment of the present disclosure.

In a specific embodiment, as shown in FIG. 12, a prediction process 800a performed at the decoding end includes the following steps.

At S800-1, a first distance between the current point and the neighbor point set composed of 3 neighbor points is obtained.

At S800-2, whether the first distance is greater than or equal to the first value is determined, step S800-3 is performed if the first distance is greater than or equal to the first value, and S800-5 is performed if the first distance is less than the first value.

At S800-3, the target prediction mode of the current point is determined as the multi-prediction mode (multi-pred).

At S800-4, the point cloud bitstream is decoded to obtain a prediction mode information of the attribute information of the current point, and the reconstructed value of the attribute information of the target neighbor point corresponding to the prediction mode information is taken as the reconstructed value of the attribute information of the current point.

At S800-5, the target prediction mode of the current point is determines as the single-prediction type mode (single-pred), and a weighted prediction type (that is, a weighted average value of the reconstructed values of the attribute information of K neighbor points) is taken as a reconstructed value of the attribute information of the current point.

Here, the prediction process of the present disclosure shown in FIG. 12 is compared with the prediction process of the existing technology shown in FIG. 7 above. In the present disclosure, the first distance between the current point and the neighbor point set is determined according to the geometrical information of the current point and the geometrical information of the neighbor point. The first distance is compared with the first value, and whether the multi-prediction mode or the single-prediction type mode is used for predicting the attribute information of the current point is determined. When the multi-prediction mode is used, the prediction mode information is obtained from the point cloud bitstream. When the single-prediction type mode is used, the prediction mode information is not obtained from the point cloud bitstream. In this way, the process of selecting the prediction mode of the current point is related to the geometrical information of the point in the point cloud, and is decoupled from the process of reconstructing the attribute information of the neighbor point, so that the process of selecting the prediction mode and the reconstruction process of the attribute information may be performed in parallel, and thus the efficiency of decoding is improved.

Figure 13:
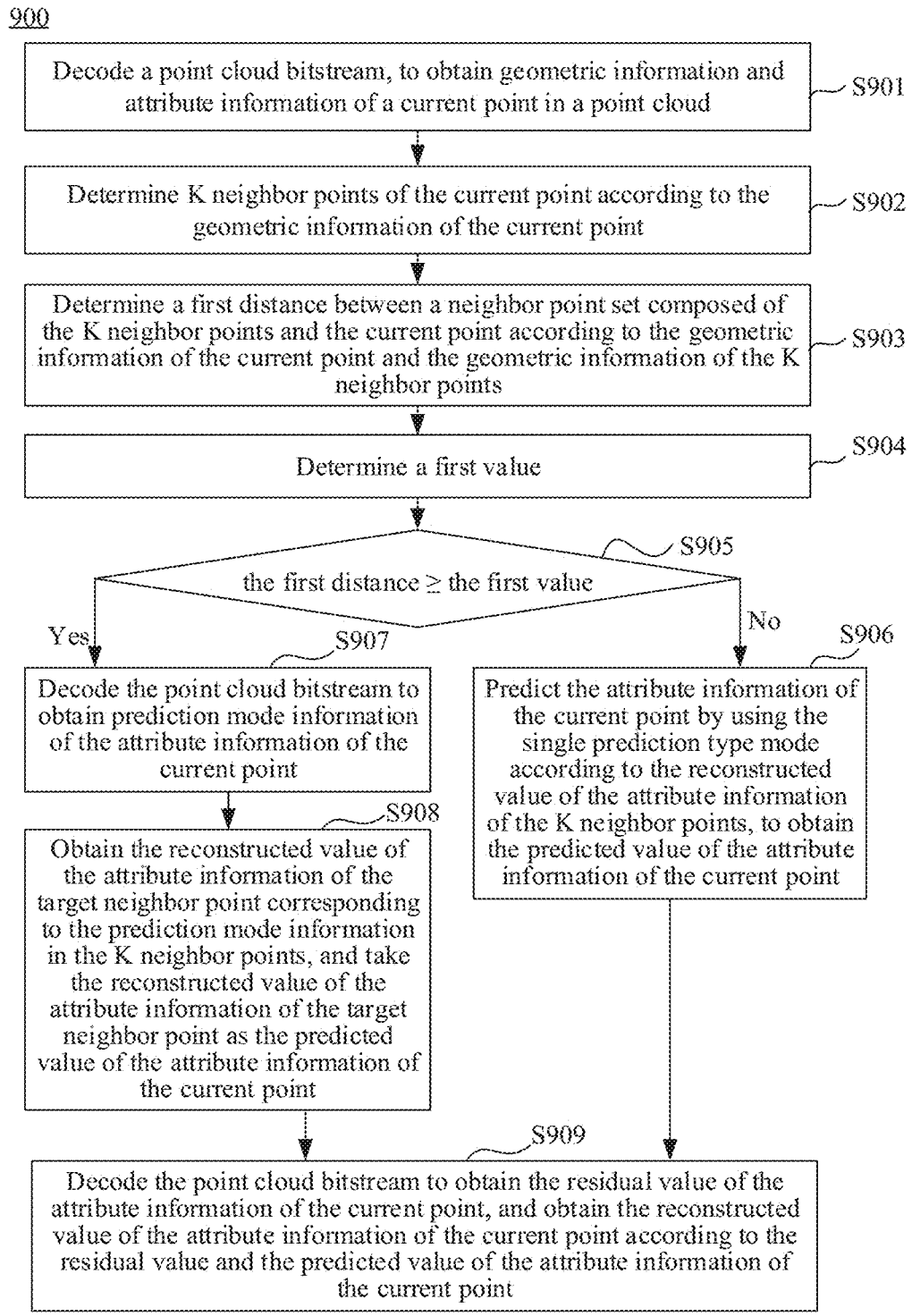
FIG. 13 is a schematic flowchart of a point cloud decoding method 900 according to an embodiment of the present disclosure.

FIG. 13 is a schematic flowchart of a point cloud decoding method 900 according to an embodiment of the present disclosure. As shown in FIG. 13, the method of the embodiment of the present disclosure includes the following steps.

At S901, a point cloud bitstream is decoded, to acquire geometric information and attribute information of a current point in a point cloud.

At S902, K neighbor points of the current point are determined according to the geometric information of the current point. K is a positive integer greater than or equal to 2.

At S903, a first distance between a neighbor point set composed of the K neighbor points and the current point is determined according to the geometric information of the current point and the geometric information of the K neighbor points.

At S904, the first value is determined. Specific reference is made to the description of the above S803-A21. For example, a bounding box of the point cloud is obtained according to the geometric information of the points in the point cloud, a length of a first side of the bounding box of the point cloud is obtained, and the first value is determined according to the length of the first side and the QP.

It is to be noted that the execution order of the above S903 and S904 is not fixed. S904 may be performed before the above S903, or may be performed after the above S903, or may be performed simultaneously with the above S903. Not limits are made thereto in the present disclosure.

At S905, whether the first distance is greater than or equal to the first value is determined, step S907 is performed if the first distance is greater than or equal to the first value, and S906 is performed if the first distance is less than the first value.

At S906, if the first distance is less than the first value, the attribute information of the current point is predicted by using the single-prediction type mode according to the reconstructed value of the attribute information of the K neighbor points to obtain the predicted value of the attribute information of the current point. For example, an average value of the reconstructed values of the attribute information of the K neighbor points is taken as the predicted value of the attribute information of the current point.

At S907, if the first distance is greater than or equal to the first value, the point cloud bitstream is decoded to obtain prediction mode information of the attribute information of the current point.

At S908, the reconstructed value of the attribute information of the target neighbor point corresponding to the prediction mode information in the K neighbor points is obtained, and the reconstructed value of the attribute information of the target neighbor point is taken as the predicted value of the attribute information of the current point.

At S909, the point cloud bitstream is decoded to obtain the residual value of the attribute information of the current point, and the reconstructed value of the attribute information of the current point is obtained according to the residual value and the predicted value of the attribute information of the current point. For example, the predicted value and the residual value of the attribute information of the current point are added to obtain the reconstructed value of the attribute information of the current point.

It is to be understood that FIG. 8 to FIG. 13 are only examples of the present disclosure, and are not to be understood as a limitation to the present disclosure.

The preferred implementation modes of the present disclosure are described in detail above in combination with the drawings. However, the present disclosure is not limited to specific details in the above implementation modes. Within the scope of the technical concept of the present disclosure, a variety of simple variants of the technical solution of the present disclosure can be carried out, and these simple variants belong to the scope of protection of the present disclosure. For example, each specific technical feature described in the above specific implementation modes can be combined in any suitable way without contradiction. In order to avoid unnecessary repetition, the present disclosure will not describe various possible combination modes separately. For another example, various different implementation modes of the present disclosure can also be combined arbitrarily, which is also considered as the content disclosed in the present disclosure as long as not violating the idea of the present disclosure.

It is also to be understood that, in various method embodiments of the present disclosure, the sequence numbers of various processes above do not mean execution sequences. The execution sequences of various processes should be determined according to functions and internal logic of the processes, and should not be construed as any limitation on the implementation processes of the embodiments of the present disclosure. In addition, in the embodiments of the present disclosure, the term "and/or" only describes an association relationship for describing associated objects and represents that three relationships may exist. Specifically, A and/or B may represent three cases: only A exists, both A and B exist, and only B exists. In addition, the character "/" herein generally indicates that the contextual objects are in an "or" relationship.

Method embodiments of the present disclosure are described in detail above in combination with FIG. 8 to FIG. 13. Apparatus embodiments of the present disclosure will be described in detail below in combination with FIG. 14 to FIG. 16.

Figure 14:
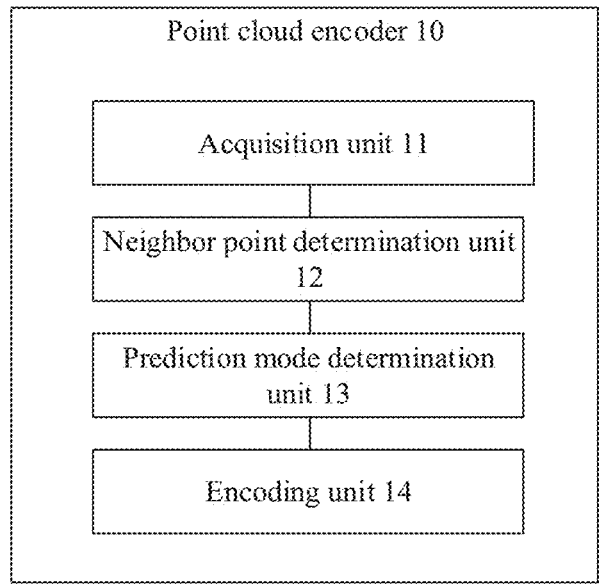
FIG. 14 is a schematic block diagram of a point cloud encoder 10 according to an embodiment of the present disclosure.

FIG. 14 is a schematic block diagram of a point cloud encoder 10 according to an embodiment of the present disclosure.

As shown in FIG. 14, a point cloud encoder 10 includes an acquisition unit 11, a neighbor point determination unit 12, a prediction mode determination unit 13, and an encoding unit 14.

The acquisition unit 11 is configured to acquire geometric information and attribute information of a current point in a point cloud.

The neighbor point determination unit 12 is configured to determine K neighbor points of the current point according to the geometric information of the current point. K is a positive integer greater than or equal to 2.

The prediction mode determination unit 13 is configured to determine a target prediction mode of the attribute information of the current point according to the geometric information of the current point and the geometric information of the K neighbor points.

The encoding unit 14 is configured to predict the attribute information of the current point by using the target prediction mode to obtain a predicted value of the attribute information of the current point, obtain a residual value of the attribute information of the current point according to the predicted value of the attribute information of the current point, and encodes the residual value of the attribute information of the current point to generate a point cloud bitstream.

In some embodiments, the prediction mode determination unit 13 is specifically configured to determine a first distance between a neighbor point set composed of the K neighbor points and the current point according to the geometric information of the current point and the geometric information of the K neighbor points, and determine a target prediction mode of the attribute information of the current point according to the first distance.

In some embodiments, the prediction mode determination unit 13 is specifically configured to determine the target prediction mode as a multi-prediction mode in a case that the first distance is greater than or equal to a first value, and determine the target prediction mode as a single-prediction type mode in a case that the first distance is less than the first value.

In some embodiments, the encoding unit 14 is specifically configured to obtain reconstructed values of the attribute information of the K neighbor points if the target prediction mode is the multi-prediction mode, take reconstructed values of the attribute information of the K neighbor points as K prediction types, take a weighted average value of the reconstructed values of the attribute information of the K neighbor points as a (K+1)th prediction type, determine an RDO value of each prediction type of K+1 prediction types, and take the prediction type with a minimum RDO value as a predicted value of the attribute information of the current point.

In some embodiments, the point cloud bitstream includes prediction mode information corresponding to the prediction type with the minimum RDO value.

In some embodiments, the prediction mode determination unit 13 is specifically configured to obtain reconstructed values of the attribute information of the K neighbor points if the target prediction mode is the single-prediction type mode, and take a weighted average value of the reconstructed values of the attribute information of K neighbor points as a predicted value of the attribute information of the current point.

In some embodiments, the encoding unit 14 is further configured to obtain a bounding box of the point cloud according to the geometric information of the points in the point cloud, the bounding box being used for enclosing the point cloud, obtain a length of a first side of the bounding box of the point cloud, and determine the first value according to the length of the first side.

In some embodiments, the encoding unit 14 is specifically configured to acquire a QP, and determine the first value according to the QP and the length of the first side.

In some embodiments, the encoding unit 14 is specifically configured to take a ratio of the length of the first side to the QP as the first value.

In some embodiments, the encoding unit 14 is specifically configured to obtain a first ratio of the length of the first side to a first preset value, obtain a second ratio of the QP to a second preset value, and determine the first value according to the first ratio and the second ratio.

In some embodiments, the encoding unit 14 is specifically configured to shift the first ratio to the left by a rounded digit of the second ratio to obtain the first value.

In some embodiments, the encoding unit 14 is specifically configured to determine the first value according to the following formula:

$$\text{geometryThreshold} = (\text{minimumbBoxLength} >> T3) << \lceil QP \div T2 \rceil,$$

Where geometryThreshold is the first value, the minimumbBoxLength is the length of the first side, $2^{T3}$ is equal to a first preset value T1, and the $\lceil QP \div T2 \rceil$ represents rounding up the QP divided by a second preset value T2.

Optionally, the first preset value T1 is greater than the second preset value T2.

Optionally, the second preset value is T2=6.

Optionally, the first preset value is 64 in a case that the first side is the shortest side of the bounding box.

Optionally, the first preset value is 128 in a case that the first side is the longest side of the bounding box.

In some embodiments, the prediction mode determination unit 13 is specifically configured to determine geometric information of a geometric centroid of the neighbor point set according to the geometric information of the K neighbor points, determine a second distance between the current point and the geometric centroid according to the geometric information of the current point and the geometric information of the geometric centroid, and determine a first distance according to the second distance.

In some embodiments, the prediction mode determination unit 13 is specifically configured to take the second distance as the first distance.

In one example, the second distance between the current point and the geometric centroid is a Euclidean distance between the current point and the geometric centroid.

In another example, the second distance between the current point and the geometric centroid is a Manhattan distance between the current point and the geometric centroid.

In some embodiments, the prediction mode determination unit 13 is specifically configured to: for each neighbor point of the K neighbor points, determine a third distance between the neighbor point and the current point according to the geometric information of the neighbor point and the geometric information of the current point, and take an average value of the third distances between neighbor points of the K neighbor points and the current point as the first distance.

It is to be understood that the apparatus embodiments correspond to the method embodiments. Similar description may refer to the method embodiments, which will not be elaborated herein to avoid repetition. Specifically, the point cloud encoder 10 as shown in FIG. 14 may perform the method of the embodiment of the present disclosure, the foregoing and other operations and/or functions of each unit in the point cloud encoder 10 are respectively used for implementing corresponding processes in methods 600, 700, and the like, which will not be elaborated herein for simplicity.

Figure 15:
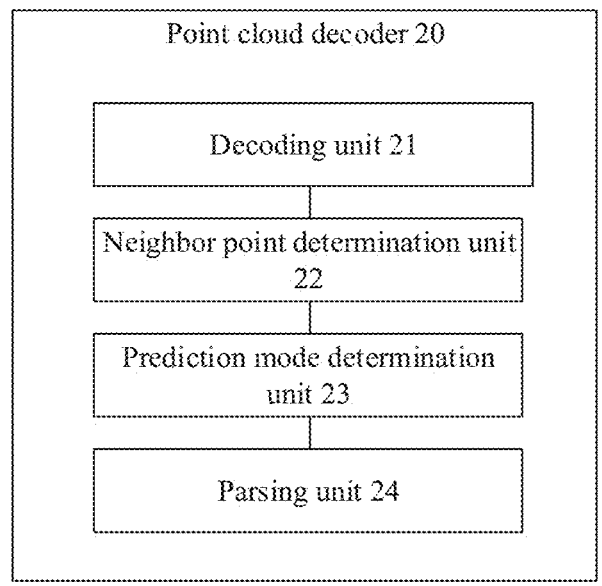
FIG. 15 is a schematic block diagram of a point cloud decoder 20 according to an embodiment of the present disclosure.

FIG. 15 is a schematic block diagram of a point cloud decoder 20 according to an embodiment of the present disclosure.

As shown in FIG. 15, the point cloud decoder 20 may include a decoding unit 21, a neighbor point determination unit 22, a prediction mode determination unit 23, and a parsing unit 24.

The decoding unit 21 is configured to decode a point cloud bitstream, to acquire geometric information and attribute information of a current point in a point cloud.

The neighbor point determination unit 22 is configured to determine K neighbor points of the current point according to the geometric information of the current point. K is a positive integer greater than or equal to 2.

The prediction mode determination unit 23 is configured to determine a target prediction mode of the attribute information of the current point according to the geometric information of the current point and the geometric information of the K neighbor points.

The parsing unit 24 is configured to predict the attribute information of the current point by using the target prediction mode to obtain a predicted value of the attribute information of the current point.

In some embodiments, the prediction mode determination unit 23 is specifically configured to determine a first distance between a neighbor point set composed of the K neighbor points and the current point according to the geometric information of the current point and the geometric information of the K neighbor points, and determine a target prediction mode of the attribute information of the current point according to the first distance.

In some embodiments, the prediction mode determination unit 23 is specifically configured to determine the target prediction mode as a multi-prediction mode in a case that the first distance is greater than or equal to a first value, and determine the target prediction mode as a single-prediction type mode in a case that the first distance is less than the first value.

In some embodiments, the parsing unit 24 is specifically configured to decode the point cloud bitstream to obtain prediction mode information of the attribute information of the current point if the target prediction mode is the multi-prediction mode, obtain the reconstructed value of the attribute information of the target neighbor point corresponding to the prediction mode information in the K neighbor points, and take the reconstructed value of the attribute information of the target neighbor point as the predicted value of the attribute information of the current point.

In some embodiments, the parsing unit 24 is specifically configured to obtain reconstructed values of the attribute information of the K neighbor points if the target prediction mode is the single-prediction type mode, and take a weighted average value of the reconstructed values of the attribute information of the K neighbor points as a predicted value of the attribute information of the target point.

In some embodiments, the parsing unit 24 is further configured to decode the point cloud bitstream to obtain geometric information of points in a point cloud, obtain a bounding box of the point cloud according to the geometric information of the points in the point cloud, the bounding box being used for enclosing the point cloud, obtain a length of a first side of the bounding box of the point cloud, and determine the first value according to the length of the first side.

In some embodiments, the parsing unit 24 is specifically configured to decode the point cloud bitstream to acquire a QP, and determine the first value according to the QP and the length of the first side.

In some embodiments, the parsing unit 24 is specifically configured to take a ratio of the length of the first side to the QP as the first value.

In some embodiments, the parsing unit 24 is specifically configured to obtain a first ratio of the length of the first side to the first preset value, obtain a second ratio of the QP to the second preset value, and determine the first value according to the first ratio and the second ratio.

In some embodiments, the parsing unit 24 is specifically configured to shift the first ratio to the left by a rounded digit of the second ratio to obtain the first value.

In some embodiments, the parsing unit 24 is specifically configured to determine the first value according to the following formula:

$$\text{geometryThreshold}=(\text{minimumbBoxLength}\gg T3)\ll\lceil QP\div T2\rceil,$$

where geometryThreshold is the first value, the minimumbBoxLength is the length of the first side, $2^{T3}$ is equal to a first preset value T1, and the $\lceil QP\div T2\rceil$ represents rounding up the QP divided by a second preset value T2.

Optionally, the first preset value T1 is greater than the second preset value T2.

Optionally, the second preset value is T2=6.

Optionally, the first preset value is 64 in a case that the first side is the shortest side of the bounding box.

Optionally, the first preset value is 128 in a case that the first side is the longest side of the bounding box.

In some embodiments, the prediction mode determination unit 23 is specifically configured to determine geometric information of a geometric centroid of the neighbor point set according to the geometric information of the K neighbor points, determine a second distance between the current point and the geometric centroid according to the geometric information of the current point and the geometric information of the geometric centroid, and determine a first distance according to the second distance.

In some embodiments, the prediction mode determination unit 23 is specifically configured to take the second distance as the first distance.

In one example, the second distance between the current point and the geometric centroid is a Euclidean distance between the current point and the geometric centroid.

In another example, the second distance between the current point and the geometric centroid is a Manhattan distance between the current point and the geometric centroid.

In some embodiments, the prediction mode determination unit 23 is specifically configured to: for each neighbor point of the K neighbor points, determine a third distance between the neighbor point and the current point according to the geometric information of the neighbor point and the geometric information of the current point, and take an average value of the third distances between neighbor points of the K neighbor points and the current point as the first distance.

It is to be understood that the apparatus embodiments correspond to the method embodiments. Similar description may refer to the method embodiments, which will not be elaborated herein to avoid repetition. Specifically, the point cloud decoder 20 as shown in FIG. 15 may correspond to corresponding subjects for implementing the methods 800 and/or 900 in the embodiments of the present disclosure, and the foregoing and other operations and/or functions of each unit in the point cloud decoder 20 are used for implementing the corresponding processes in the methods 800 and/or 900, respectively, which will not be elaborated herein for simplicity.

The apparatus and system of the embodiments of the present disclosure are described above from the perspective of functional units in combination with the drawings. It is to be understood that the functional units may be realized in the form of hardware, or may be realized through instructions in the form of software, or may be realized through a combination of hardware and software units. Specifically, each step of the method embodiment in the embodiment of the present disclosure may be completed by the integrated logic circuit of hardware in the processor and/or instructions in the form of software.

Steps of the methods disclosed in combination with the embodiments of the present disclosure may be directly performed and completed by a hardware decoding processor, or may be performed and completed by a combination of hardware and software modules in the decoding processor. Optionally, the software unit may be located in a mature storage medium in the art, such as a random access memory, a flash memory, a read-only memory, a programmable read-only memory, an electrically erasable programmable memory, and a register. The storage medium is located in the memory, and the processor reads information in the memory and completes the steps in the above method embodiments in combination with hardware.

Figure 16:
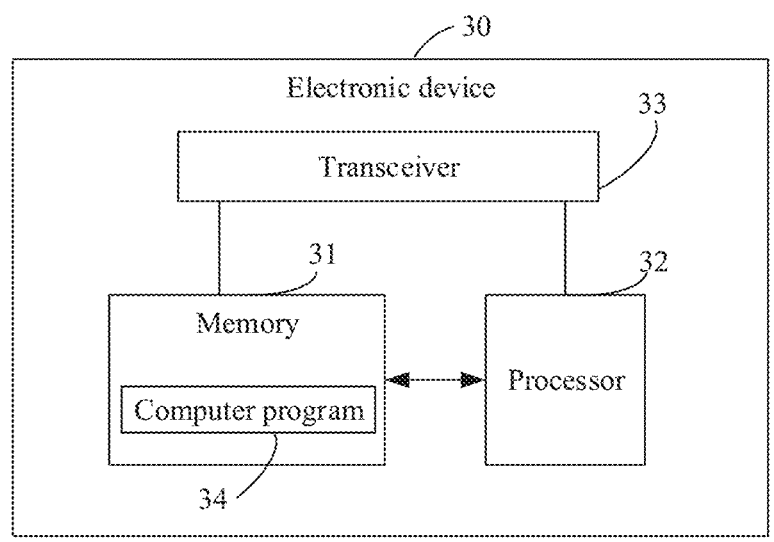
FIG. 16 is a schematic block diagram of an electronic device 30 according to an embodiment of the present disclosure.

FIG. 16 is a schematic block diagram of an electronic device 30 according to an embodiment of the present disclosure.

As shown in FIG. 16, the electronic device 30 may be the point cloud encoder or the point cloud decoder as described in the embodiments of the present disclosure. The electronic device 30 may include a memory 33 and a processor 32.

The memory 33 is configured to store a computer program 34, and transmit the program code 34 to the processor 32. In other words, the processor 32 may call and run the computer program 34 from the memory 33 to implement the method in the embodiment of the present disclosure.

For example, the processor 32 may be configured to execute the steps in the above method 200 according to the instruction in the computer program 34.

In some embodiments of the present disclosure, the processor 32 may include, but is not limited to:

a universal processor, a Digital Signal Processor (DSP), an Application Specific Integrated Circuit (ASIC), a Field Programmable Gate Array (FPGA) or other programmable logic devices, discrete gates or transistor logic devices, discrete hardware components.

In some embodiments of the present disclosure, the memory 33 includes, but is not limited to:

a volatile memory and/or a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external buffer. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

In some embodiments of the present disclosure, the computer program 34 may be partitioned into one or more units. The one or more units are stored in the memory 33 and are executed by the processor 32 to complete the method provided by the present disclosure. The one or more units may be a series of computer program instruction segments capable of completing particular functions, and the instruction segments are used to describe the execution of the computer program 34 in the electronic device 30.

As shown in FIG. 16, the electronic device 30 may further include a transceiver 33.

The transceiver 33 may be connected to the processor 32 or the memory 31.

The processor 32 may control the transceiver 33 to communicate with other devices. Specifically, the processor 32 may control the transceiver 33 to transmit information or data to other devices, or receive the information or data transmitted by other devices. The transceiver 33 may include a transmitter and a receiver. The transceiver 33 may further include an antenna. There may be one or more antennae.

It is to be understood that various components in the electronic device 30 are connected through a bus system. In addition to a data bus, the bus system further includes a power bus, a control bus, and a state signal bus.

Figure 17:
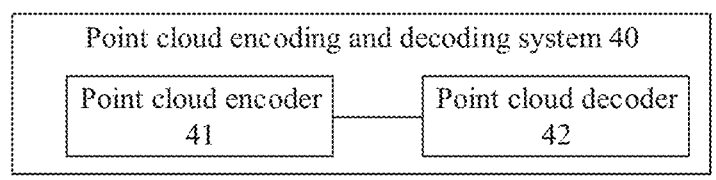
FIG. 17 is a schematic block diagram of a point cloud encoding and decoding system 40 according to an embodiment of the present disclosure.

FIG. 17 is a schematic block diagram of a point cloud encoding and decoding system 40 according to an embodiment of the present disclosure.

As shown in FIG. 17, the point cloud encoding and decoding system 40 may include: a point cloud encoder 41 and a point cloud decoder 42. The point cloud encoder 41 is used for performing the point cloud encoding method involved in the embodiment of the present disclosure. The point cloud decoder 42 is used for performing the point cloud decoding method involved in the embodiment of the present disclosure.

The present disclosure further provides a computer storage medium, which stores a computer program. The computer program enables a computer to perform the method of the above method embodiment when being executed by the computer. Or, an embodiment of the present disclosure further provides a computer program product including an instruction. When the instruction is executed by a computer, the program product is run on a computer, and the computer performs the method in the above method embodiment.

Embodiments of the present disclosure provide a point cloud encoding and decoding method and system, a point cloud encoder, and a point cloud decoder, so as to improve the efficiency of encoding a point cloud.

In a first aspect, the present disclosure provides a point cloud encoding method, which includes the following operations.

Geometric information and attribute information of a current point in a point cloud are acquired.

K neighbor points of the current point are determined according to the geometric information of the current point. K is a positive integer greater than or equal to 2.

A target prediction mode of the attribute information of the current point is determined according to the geometric information of the current point and the geometric information of the K neighbor points.

The attribute information of the current point is predicted by using the target prediction mode to obtain a predicted value of the attribute information of the current point.

A residual value of the attribute information of the current point is obtained according to the predicted value of the attribute information of the current point.

The residual value of the attribute information of the current point is encoded to generate a point cloud bitstream.

In a second aspect, an embodiment of the present disclosure provides a point cloud decoding method, which includes the following operations.

A point cloud bitstream is decoded, and geometric information and attribute information of a current point in a point cloud are acquired.

K neighbor points of the current point are determined according to the geometric information of the current point. K is a positive integer greater than or equal to 2.

A target prediction mode of the attribute information of the current point is determined according to the geometric information of the current point and the geometric information of the K neighbor points.

The attribute information of the current point is predicted by using the target prediction mode to obtain a predicted value of the attribute information of the current point.

In a third aspect, the present disclosure provides a point cloud encoder, which is configured to perform the method in the above first aspect or various implementations thereof. Specifically, the encoder includes functional units configured to perform the method in the above first aspect or various implementation modes thereof.

In a fourth aspect, the present disclosure provides a point cloud decoder, which is configured to perform the method in the above second aspect or various implementation modes thereof. Specifically, the decoder includes functional units configured to perform the method in the above second aspect or various implementation modes thereof.

In a fifth aspect, a point cloud encoder is provided, which includes a processor and a memory. The memory is configured to store a computer program. The processor is configured to call and run the computer program stored in the memory to perform the method in the above first aspect or various implementation modes thereof.

In a sixth aspect, a point cloud decoder is provided, which includes a processor and a memory. The memory is configured to store a computer program. The processor is configured to call and run the computer program stored in the memory to perform the method in the above second aspect or various implementation modes thereof.

In a seventh aspect, a point cloud encoding and decoding system is provided, which includes a point cloud encoder and a point cloud decoder. The point cloud encoder is configured to perform the method in the above first aspect or various implementation modes thereof. The point cloud decoder is configured to perform the method in the above second aspect or various implementation modes thereof.

In an eighth aspect, a chip is provided, which is configured to implement the method in either of the above first aspect and second aspect or various implementation modes thereof. Specifically, the chip includes a processor, configured to call and run a computer program in a memory to enable a device installed with the chip to perform the method in either of the above first aspect and second aspect or various implementation modes thereof.

In a ninth aspect, a computer-readable storage medium is provided, which is configured to store a computer program. The computer program enables a computer to perform the method in either of the above first aspect and second aspect or various implementation modes thereof.

In tenth aspect, a computer program product is provided, which includes a computer program instruction. The computer program instruction enables a computer to perform the method in either of the above first aspect and second aspect or various implementation modes thereof.

In an eleventh aspect, a computer program is provided. When the computer program runs on a computer, the computer is enabled to perform the method in either of the above first aspect and second aspect or various implementation modes thereof.

Based on the above technical solutions, a prediction mode of attribute information of a current point is determined through geometric information of a point in a point cloud, so that a determination process of the prediction mode is decoupled from a reconstruction process of the attribute information of the point in the point cloud, the two processes can be performed in parallel, and thus the efficiency of encoding and decoding is improved. When software is used for implementing the embodiments, the embodiments may be implemented completely or partially in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or other programmable apparatuses. The computer instruction may be stored in a computer-readable storage medium, or transmitted from one computer-readable storage medium to another computer-readable storage medium. For example, the computer instruction may be transmitted from one website site, computer, server or data center to another website site, computer, server or data center through wired (such as a coaxial cable, an optical fiber, a Digital Subscriber Line (DSL)) or wireless (such as infrared, wireless, microwave, and the like). The computer-readable storage medium may be any available medium for the computer or a data storage device, such as a server and a data center, including one or more integrated available media. The available medium may be a magnetic medium (such as floppy disk, hard disk, and magnetic tape), an optical medium (such as a DVD), or a semiconductor medium (such as a solid state disk (SSD)).

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may realize the described functions for each particular application by different methods, but it is not to be considered that the implementation is beyond the scope of the present disclosure.

In the several embodiments provided in the present disclosure, it is to be understood that the disclosed system, apparatus, and method may be implemented in other manners. For example, the described apparatus embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and the parts displayed as units may or may not be physical units, may be located in one position, or may be distributed on a plurality of network units. Part or all of the units may be selected according to actual requirements to achieve the objectives of the solutions of the embodiments. In for example, the functional units in the various embodiments of the present disclosure may be integrated into one processing unit, or each unit may exist alone physically, or two or more than two units may be integrated into one unit.

The above descriptions are merely specific implementation modes of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A point cloud encoding method, comprising:
   acquiring geometric information and attribute information of a current point in a point cloud;
   determining K neighbor points of the current point according to the geometric information of the current point, K being a positive integer greater than or equal to 2;
   determining a target prediction mode of the attribute information of the current point according to the geometric information of the current point and geometric information of the K neighbor points;
   predicting the attribute information of the current point by using the target prediction mode to obtain a predicted value of the attribute information of the current point;
   obtaining a residual value of the attribute information of the current point according to the predicted value of the attribute information of the current point; and
   encoding the residual value of the attribute information of the current point to generate a point cloud bitstream,
   wherein the determining a target prediction mode of the attribute information of the current point according to the geometric information of the current point and the geometric information of the K neighbor points comprises:
   determining a first distance between a neighbor point set composed of the K neighbor points and the current point according to the geometric information of the current point and the geometric information of the K neighbor points; and
   determining the target prediction mode of the attribute information of the current point according to the first distance,
   wherein the method further comprises:
   obtaining a bounding box of the point cloud according to the geometric information of points in the point cloud, the bounding box being used for enclosing the point cloud;
   obtaining a length of a first side of the bounding box of the point cloud; and
   determining a first value for determining target prediction mode according to the length of the first side.

2. The method of claim 1, wherein the target prediction mode is a multi-prediction mode, the predicting the attribute information of the current point by using the target prediction mode to obtain a predicted value of the attribute information of the current point comprises:
   obtaining reconstructed values of the attribute information of the K neighbor points;
   taking the reconstructed values of the attribute information of the K neighbor points as K prediction types;
   taking a weighted average value of the reconstructed values of the attribute information of the K neighbor points as a (K+1)th prediction type;
   determining a Rate Distortion Optimization (RDO) value of each prediction type of K+1 prediction types; and
   taking a prediction type with a minimum RDO value as a predicted value of the attribute information of the current point.

3. A point cloud decoding method, comprising:
   decoding a point cloud bitstream, to acquire geometric information and attribute information of a current point in a point cloud;
   determining K neighbor points of the current point according to the geometric information of the current point, K being a positive integer greater than or equal to 2;
   determining a target prediction mode of the attribute information of the current point according to the geometric information of the current point and the geometric information of the K neighbor points; and
   predicting the attribute information of the current point by using the target prediction mode to obtain a predicted value of the attribute information of the current point,
   wherein the determining a target prediction mode of the attribute information of the current point according to the geometric information of the current point and the geometric information of the K neighbor points comprises:
   determining a first distance between a neighbor point set composed of the K neighbor points and the current point according to the geometric information of the current point and the geometric information of the K neighbor points; and
   determining the target prediction mode of the attribute information of the current point according to the first distance,
   wherein the method further comprises:
   decoding the point cloud bitstream, to obtain the geometric information of points in the point cloud;
   obtaining a bounding box of the point cloud according to the geometric information of the points in the point cloud, the bounding box being used for enclosing the point cloud;
   obtaining a length of a first side of the bounding box of the point cloud; and
   determining a first value for determining target prediction mode according to the length of the first side.

4. The method of claim 3, wherein the target prediction mode is a multi-prediction mode, the predicting the attribute information of the current point by using the target prediction mode to obtain a predicted value of the attribute information of the current point comprises:
   decoding the point cloud bitstream to obtain prediction mode information of the attribute information of the current point;
   obtaining a reconstructed value of the attribute information of a target neighbor point corresponding to the prediction mode information in the K neighbor points; and
   taking a reconstructed value of the attribute information of the target neighbor point as the predicted value of the attribute information of the current point.

5. The method of claim 3, wherein the target prediction mode is a single-prediction type mode, the predicting the attribute information of the current point by using the target prediction mode to obtain a predicted value of the attribute information of the current point comprises:
   obtaining reconstructed values of the attribute information of the K neighbor points; and taking a weighted average value of the reconstructed values of the attribute information of the K neighbor points as a predicted value of the attribute information of the target point.

6. The method of claim 3, wherein the determining the first value according to the length of the first side comprises:
decoding the point cloud bitstream, to acquire a quantization parameter (QP); and
determining the first value according to the QP and the length of the first side.

7. The method of claim 6, wherein the determining the first value according to the QP and the length of the first side comprises:
taking a ratio of the length of the first side to the QP as the first value.

8. The method of claim 7, wherein the determining the first value according to the QP and the length of the first side comprises:
obtaining a first ratio of the length of the first side to a first preset value;
obtaining a second ratio of the QP to a second preset value; and
determining the first value according to the first ratio and the second ratio.

9. The method of claim 8, wherein the determining the first value according to the first ratio and the second ratio comprises:
shifting the first ratio to left by a rounded digit of the second ratio to obtain the first value.

10. The method of claim 8, wherein the determining the first value according to the first ratio and the second ratio comprises:
determining the first value according to the following formula:

geometryThreshold=(minimumbBoxLength>>$T3$)
<<⌈$QP÷T2$⌉, where geometryThreshold is the first value, the minimumbBoxLength is the length of the first side, $2^{T3}$ is equal to a first preset value T1, and the ⌈$QP÷T2$⌉ represents rounding up the QP divided by a second preset value T2.

11. The method of claim 8, wherein the first preset value is greater than the second preset value.

12. The method of claim 3, wherein the determining a first distance between the current point and the neighbor point set according to the geometric information of the current point and the geometric information of the K neighbor points comprises:
determining geometric information of a geometric centroid of the neighbor point set according to the geometric information of the K neighbor points;
determining a second distance between the current point and the geometric centroid according to the geometric information of the current point and the geometric information of the geometric centroid; and
determining the first distance according to the second distance.

13. The method of claim 12, wherein the determining the first distance according to the second distance comprises:
taking the second distance as the first distance.

14. The method of claim 12, wherein the second distance between the current point and the geometric centroid is a Euclidean distance or Manhattan distance between the current point and the geometric centroid.

15. The method of claim 3, wherein the determining a first distance between the current point and the neighbor point set according to the geometric information of the current point and the geometric information of the K neighbor points comprises:
for each neighbor point of the K neighbor points, determining a third distance between the neighbor point and the current point according to the geometric information of the neighbor point and the geometric information of the current point; and
taking an average value of the third distances between the K neighbor points and the current point as the first distance.

16. A point cloud decoder, comprising a processor and a memory, wherein
the memory is configured to store a computer program; and
the processor is configured to call and run the computer program stored in the memory to:
decode a point cloud bitstream, to acquire geometric information and attribute information of a current point in a point cloud;
determine K neighbor points of the current point according to the geometric information of the current point, K being a positive integer greater than or equal to 2;
determine a target prediction mode of the attribute information of the current point according to the geometric information of the current point and the geometric information of the K neighbor points; and
predict the attribute information of the current point by using the target prediction mode to obtain a predicted value of the attribute information of the current point,
wherein in determining a target prediction mode of the attribute information of the current point according to the geometric information of the current point and the geometric information of the K neighbor points, the processor is configured to call and run the computer program stored in the memory to:
determine a first distance between a neighbor point set composed of the K neighbor points and the current point according to the geometric information of the current point and the geometric information of the K neighbor points; and
determine the target prediction mode of the attribute information of the current point according to the first distance,
wherein the processor is further configured to call and run the computer program stored in the memory to:
decode the point cloud bitstream, to obtain the geometric information of points in the point cloud;
obtain a bounding box of the point cloud according to the geometric information of the points in the point cloud, the bounding box being used for enclosing the point cloud;
obtain a length of a first side of the bounding box of the point cloud; and
determine a first value for determining target prediction mode according to the length of the first side.

17. A point cloud encoder, comprising a processor and a memory, wherein
the memory is configured to store a computer program; and
the processor is configured to call and run the computer program stored in the memory to:
acquire geometric information and attribute information of a current point in a point cloud;
determine K neighbor points of the current point according to the geometric information of the current point, K being a positive integer greater than or equal to 2;

determine a target prediction mode of the attribute information of the current point according to the geometric information of the current point and geometric information of the K neighbor points;
predict the attribute information of the current point by using the target prediction mode to obtain a predicted value of the attribute information of the current point;
obtain a residual value of the attribute information of the current point according to the predicted value of the attribute information of the current point; and
encode the residual value of the attribute information of the current point to generate a point cloud bitstream,
wherein in determining a target prediction mode of the attribute information of the current point according to the geometric information of the current point and the geometric information of the K neighbor points, the processor is configured to call and run the computer program stored in the memory to:
determine a first distance between a neighbor point set composed of the K neighbor points and the current point according to the geometric information of the current point and the geometric information of the K neighbor points; and
determine the target prediction mode of the attribute information of the current point according to the first distance,
wherein the processor is further configured to call and run the computer program stored in the memory to:
obtain a bounding box of the point cloud according to the geometric information of points in the point cloud, the bounding box being used for enclosing the point cloud;
obtain a length of a first side of the bounding box of the point cloud; and
determine a first value for determining target prediction mode according to the length of the first side.

18. A non-transitory computer readable medium, storing a computer program and a point cloud bitstream, wherein the computer program, when executed by a processor, implements a point cloud encoding method to generate the point cloud bitstream, the method comprising:

acquiring geometric information and attribute information of a current point in a point cloud;
determining K neighbor points of the current point according to the geometric information of the current point, K being a positive integer greater than or equal to 2;
determining a target prediction mode of the attribute information of the current point according to the geometric information of the current point and geometric information of the K neighbor points;
predicting the attribute information of the current point by using the target prediction mode to obtain a predicted value of the attribute information of the current point;
obtaining a residual value of the attribute information of the current point according to the predicted value of the attribute information of the current point; and
encoding the residual value of the attribute information of the current point to generate the point cloud bitstream,
wherein the determining a target prediction mode of the attribute information of the current point according to the geometric information of the current point and the geometric information of the K neighbor points comprises:
determining a first distance between a neighbor point set composed of the K neighbor points and the current point according to the geometric information of the current point and the geometric information of the K neighbor points; and
determining the target prediction mode of the attribute information of the current point according to the first distance,
wherein the method further comprises:
obtaining a bounding box of the point cloud according to the geometric information of points in the point cloud, the bounding box being used for enclosing the point cloud;
obtaining a length of a first side of the bounding box of the point cloud; and
determining a first value for determining target prediction mode according to the length of the first side.

* * * * *